United States Patent [19]

Vitek et al.

[11] Patent Number: 4,845,634
[45] Date of Patent: Jul. 4, 1989

[54] PRODUCT INFORMATION NETWORK SYSTEM

[75] Inventors: Robert F. Vitek, Timonium; Craig R. Holmes; Laura B. Edwards, both of Columbia, all of Md.

[73] Assignee: Westinghouse Electric Corp., Pittsburgh, Pa.

[21] Appl. No.: 79,210

[22] Filed: Jul. 29, 1987

[51] Int. Cl.$^4$ .............................................. G06F 15/46
[52] U.S. Cl. ................................... 364/468; 358/101; 364/189; 364/192; 364/474.24
[58] Field of Search ............... 364/468, 132, 474, 200, 364/900, 188, 189, 191–193, 468, 474.22–474.27, 514, 518, 521; 358/101, 903

[56] References Cited

U.S. PATENT DOCUMENTS

| | | | |
|---|---|---|---|
| 4,295,198 | 10/1981 | Copeland et al. | 364/191 |
| 4,472,783 | 9/1984 | Johnstone et al. | 364/468 X |
| 4,604,718 | 8/1986 | Norman et al. | 364/468 X |
| 4,700,318 | 10/1987 | Ockman | 364/468 X |
| 4,730,258 | 3/1988 | Takeda et al. | 364/191 X |

Primary Examiner—Joseph Ruggiero
Attorney, Agent, or Firm—W. G. Sutcliff

[57] ABSTRACT

A manufacturing data creation and distribution system comprises a computer with a graphics-capable display screen. The computer is capable of processing programmable instructions and creating data, and of generating graphic images on the display screen. A video camera is connected to the computer, and the computer includes hardware which can digitize the images transmitted by the video camera into a computer-readable form and display the digitized camera images on the display screen.

A plurality of microprocessor-controlled workstations are networked to a microprocessor-controlled networking and file server, which can selectively retrieve data and transmit such data to the workstations for display. Also included within the computer is the capability to selectively manipulate the image-data received from the video camera to generate a manufacturing aid applicable to a product to be produced.

13 Claims, 34 Drawing Sheets

57

```
Allows creation of new set or completion of unfinished set.

┌──────── Main Menu ────────┐
        │  A   Create a new aid set  │
        │  B   Alter an existing aid set │
        │  C   Retrive an existing aid set │
        │      Exit                  │
        └────────────────────────────┘

Type <?> for HELP
For selection, use up/down arrows, then press<Enter> or type first letter.
```

```
┌──────── ********** DIRECTORY OF AIDSETS ********** ────────┐

BOARD STYLE #   AID TYPE   BOARD REV   AID REV
BOARD 1          MA          B           B
BOARD 3          MA          D           D
BOARD 5          MA          F           F
BOARD 7          MA          H           H
BOARD 10         MA          K           K
BOARD 11         MA          L           L
BOARD 13         MA          N           N
BOARD 14         MA          O           O
BOARD 16         MA          Q           Q
BOARD 17         MA          R           R
BOARD 18         MA          S           S
BOARD 19         MA          T           T
BOARD 22         MA          W           W
BOARD 23         MA          X           X
BOARD 27         MA          C           C

┌─────────────────────────────────────────────────────────┐
│  Use up/down arrows and press <Enter ai> to make selection │
│  Use <PgUp>/<PgDn> to see next or previous page of records │
│  Use <Home>/<End> to see first or last page of records     │
└─────────────── Use <Esc> to quit ──────────────────────┘
```

| ***** DIRECTORY OF PAGES IN AIDSET ***** | | | |
|---|---|---|---|
| SHEET # | SHEET REV | DISK # | DESCRIPTION |
| 1 | – | 1 | 686R750-D. PAD |
| 2 | – | 1 | 757R655-RING MS |
| 3 | – | 1 | 762R056-BAR. VD |
| 4 | – | 1 | 686R795-EXC SLD |
| 5 | – | 1 | 758R575-SHV. LD |
| 6 | – | 1 | 750R962-MARKING |
| 7 | – | 2 | 683R598-LEADS |
| 8 | – | 2 | 756R613-CR DIOD |
| 9 | – | 2 | 686R750-BENDS |
| 10 | – | 2 | 12607675-BK LD |
| 11 | – | 2 | 12607675-MISOR |
| 12 | – | 2 | 12607675-BT LD |
| 13 | – | 4 | 683R598-BT TAB |
| 14 | – | 4 | EXCESS SOLDER |
| 15 | – | 4 | BK & MS LDS |

\* DENOTES PAGE IS UNFINISHED
USE <SPACE> TO FINISH OR EDIT SELECTED PAGES
USE UP/DOWN ARROWS AND PRESS <ENTER↵> TO SELECT OR UNSELECT PAGE
USE <PGUP>/<PGDN> TO SEE NEXT OR PREVIOUS PAGE OF RECORDS
USE <HOME>/<END> TO SEE FIRST OR LAST PAGE OF RECORDS
\*—USE <ESC> TO QUIT—\* \*—USE <A> TO SELECT ALL—\*

FIG. 14

```
         WESTINGHOUSE PRODUCT INFORMATION NETWORK
FUNCTION:   ALLOWS YOU TO ADD A PAGE AT THE END OF THE AIDSET
              ────── AIDSET CREATE\ALTER MENU ──────
              A  ADD A NEW PAGE TO END OF SET
              B  INSERT A NEW PAGE INTO SET
              C  DELETE A PAGE FROM THE SET
              D  MAKE CHANGES TO A PAGE
              E  SHOW PAGES IN CURRENT SET
              F  VIEW EXISTING PAGE
              G  EXIT

FOR SELECTION, USE UP/DOWN ARROWS, THEN PRESS <ENTER> OR TYPE FIRST LETTER.
                    ── TYPE <?> FOR HELP ──
        85
```

FIG. 16

```
    ********    LIST OF RECORDS IN CURRENT SET    ********
    SHEET #      SHEET REV       DISK #         DESCRIPTION
       1            -               1           686R750-D. PAD
       2            -               1           757R655-RING MS
       3            -               1           762R056-BAR. VD
       4            -               1           686R795-EXC SLD
       5            -               1           758R575-SHV. LD
       6            -               1           750R962-MARKING
       7            -               2           683R598-LEADS
       8            -               2           756R613-CR DIOD
       9            -               2           686R750-BENDS
      10            -               2           12607675-BK LD
      11            -               2           12607675-MISOR
      12            -               2           12607675-BT LD
      13            -               4           683R598-BT TAB
      14            -               4           EXCESS SOLDER
      15            -               4           BK & MS LDS
    USE <PGUP>/<PGDN> TO SEE PREVIOUS/NEXT PAGE OF RECORDS
       USE <HOME>/<END> TO SEE FIRST/LAST PAGE OF RECORDS
    ── * DENOTES SHEET IS UNFINISHED ──── USE <ESC> TO QUIT ──
```

| WESTINGHOUSE PRODUCT INFORMATION NETWORK | COPYRIGHT 1987 (W) |

FUNCTION: CREATE A CAPTURED IMAGE IN A DEFINED AREA.

─── DEFINED REGION MENU ───
DEFINE A CAPTURE REGION
CLEAR A REGION
FILTER A REGION
ENHANCE A REGION
PREVIOUS MENU

AIDSET INFORMATION
A-BRD ID: FORMING (DEFECT)
B-SET TYPE: FD
C-BRD REV: -
D-SET REV: $$
E-SHEET REV: -
F-RN DOC#:
G-BIP:
H-MQD#:
I-EFF:
J-SHEET #: 22
AID DESC:
BANNER STRING: ABCFGJ

FOR SELECTION, USE UP/DOWN ARROWS, THEN PRESS<ENTER> OR TYPE FIRST LETTER.
─── TYPE <?> FOR HELP ───

FIG. 21

```
┌─────────────────────────────────────────────────────────────┐
│         WESTINGHOUSE PRODUCT INFORMATION NETWORK            │
│  ┌───────────────────────────────────────────────────────┐  │
│  │ FUNCTION:  LOADS IN A FULL SCREEN TEXT EDITOR FOR FILE CREATION. │
│  └───────────────────────────────────────────────────────┘  │
│                                                             │
│   ┌─── NOTEPAD MENU ──────┐   ┌──────────────────────────┐  │
│   │ 1 CREATE A NEW TEXT FILE │ │    NOTE FILE INFORMATION │  │
│   │ 2 EDIT AN EXISTING TEXT FILE │ CURRENT FILE: DEFAULT NOT│
│   │ 3 DISPLAY TEXT FILE ON THE AID│ NUMBER OF LINES:    10 │  │
│   │ 4 GENERATE SINGLE LINE NOTE │ HEADER STATUS:       ON  │  │
│   │ 5 NOTEPAD UTILITIES   │   │ BACKGROUND COLOR:    -1   │  │
│   │ 6 PREVIOUS MENU       │   │ CHARACTER COLOR:     15   │  │
│   └───────────────────────┘   │ CHARACTER HEIGHT:         │  │
│                               │ CURRENT FONT:    ROMAN2   │  │
│                               └──────────────────────────┘  │
│  FOR SELECTION, USE UP/DOWN ARROWS, THEN PRESS <ENTER> OR TYPE FIRST LETTER. │
│                     ─── TYPE <?> FOR HELP ───               │
└─────────────────────────────────────────────────────────────┘
        219                                    FIG. 22
                    271
┌─────────────────────────────────────────────────────────────┐
│         WESTINGHOUSE PRODUCT INFORMATION NETWORK            │
│  ┌───────────────────────────────────────────────────────┐  │
│  │ FUNCTION:  REDISPLAY THE SAVED ORIENTATION IMAGE IN A CHOSEN LOCATION. │
│  └───────────────────────────────────────────────────────┘  │
│                                                             │
│   ┌─ REDISPLAY STORED IMAGE MENU ┐  ┌─────────────────────┐ │
│   │ ORIENTATION IMAGE            │  │   AIDSET INFORMATION│ │
│   │ SAVED SCREEN IMAGE           │  │ A-BRD ID: FORMING (DEFECT)│
│   │ INITIAL SESSION IMAGE        │  │ B-SET TYPE: FD      │ │
│   │ PREVIOUS MENU                │  │ C-BRD REV: -        │ │
│   └──────────────────────────────┘  │ D-SET REV:  $$      │ │
│                                     │ E-SHEET REV:-       │ │
│                                     │ F-RN DOC#:          │ │
│                                     │ G-BIP:              │ │
│                                     │ H-MQD#:             │ │
│                                     │ I-EFF:              │ │
│                                     │ J-SHEET #:   22     │ │
│                                     │ AID DESC:           │ │
│                                     │ BANNER STRING: ABCFGJ│ │
│                                     └─────────────────────┘ │
│  FOR SELECTION, USE UP/DOWN ARROWS, THEN PRESS <ENTER> OR TYPE FIRST LETTER. │
│                     ─── TYPE <?> FOR HELP ───               │
└─────────────────────────────────────────────────────────────┘
                                                FIG. 23
```

311

```
┌─────────────────────────────────────────────────────────────┐
│      WESTINGHOUSE PRODUCT INFORMATION NETWORK   COPYRIGHT 1987  (W)  │
├─────────────────────────────────────────────────────────────┤
│                                                             │
│  ┌─ FUNCTION:  SAVE THE CURRENT SCREEN AND DECLARE IT A FINISHED PAGE. ─┐│
│                                                             │
│  ┌─ FINISH PROCESSING MENU ─┐   ┌──────────────────────┐   │
│  │ FINISHED SHEET           │   │     AIDSET INFORMATION │   │
│  │ UNFINISHED SHEET         │   │ A-BRD ID:  FORMING (DEFECT)│
│  │ REUSEABLE SCREEN         │   │ B-SET TYPE: FD        │   │
│  │ EXIT WITHOUT SAVING      │   │ C-BRD REV: -          │   │
│  │ PREVIOUS MENU            │   │ D-SET REV: $$         │   │
│  └──────────────────────────┘   │ E-SHEET REV: -        │   │
│                                 │ F-RN DOC#:            │   │
│                                 │ G-BIP:                │   │
│                                 │ H-MQD#:               │   │
│                                 │ I-EFF:                │   │
│                                 │ J-SHEET #:  22        │   │
│                                 │ AID DESC:             │   │
│                                 │ BANNER STRING: ABCFGJ │   │
│                                 └──────────────────────┘   │
│                                                             │
│  FOR SELECTION, USE UP/DOWN ARROWS, THEN PRESS <ENTER> OR TYPE FIRST LETTER. │
│                     ──── TYPE <?> FOR HELP ────             │
└─────────────────────────────────────────────────────────────┘
```

FIG. 24

```
WESTINGHOUSE PRODUCT INFORMATION NETWORK

FUNCTION:   GENERATE THE NOTE FILE LISTED AS THE CURRENT FILE.

┌─ FILE CHOICE MENU ─┐      ┌─ NOTE FILE INFORMATION ─┐
│ A SELECT CURRENT FILE │   │ CURRENT FILE: DEFAULT. NOT │
│ B FILE MANAGER        │   │ NUMBER OF LINES:       10 │
│ C PREVIOUS MENU       │   │ HEADER STATUS:         ON │
└────────────────────┘      │ BACKGROUND COLOR:      -1 │
                            │ CHARACTER COLOR:       15 │
                            │ CHARACTER HEIGHT:         │
                            │ CURRENT FONT:     ROMAN2  │
                            └──────────────────────────┘

FOR SELECTION, USE UP/DOWN ARROWS, THEN PRESS <ENTER> OR TYPE FIRST LETTER.
                         TYPE <?> FOR HELP
```

```
WESTINGHOUSE PRODUCT INFORMATION NETWORK

PAGE 1 OF 1

NGM006  C        NGM001  C        NGS005  C

NGS006  C        NGS003  C        NGS004  C

NGS001  C        SCR_IO  C        NGS002  C

NGS007  C        NGM003  C        NGM002  C

NGM005  C        NGM004  C

<ESC>      FIRST        PREV
                              QUIT       PAGE  ↑      PAGE →

LAST  ↓      NEXT
                                         PAGE         PAGE
```

FIG. 27

| EXAMPLE OF AIDSET RECORD FILE | |
|---|---|
| TYPICAL INFORMATION | FIELDNAME |
| 762R125 | BOARD _ NUMBER |
| MA | AID _ TYPE |
| MA000001 | SET _ NAME |
| B | BOARD _ REVISION _ LEVEL |
| C | AIDSET _ REVISION _ LEVEL |
| T | COMPLETED |
| F | ALTERATION _ STATUS |
| ABCDEF | BANNER _ FIELDS |
| F | ROLLOVER |
| A | PREVIOUS _ BOARD _ REVILATION _ LEVEL |
| B | AIDSET_HIGHEST_REVISION_LEVEL_FOR_EACH_BOARD_REVISION |
| AA000012 | ROLLED _ FROM |
| A | REV _ NOTICES |
| 012387 | MFG. _ START |

FIG. 31

| EXAMPLE OF PAGE RECORD FILE | |
|---|---|
| TYPICAL INFORMATION | FIELDNAME |
| 3 | SHEET _ NUMBER |
| B | SHEET _ REVISION |
| A | LAST _ AID _ REVISION |
| 183540 | SIZE _ OF _ IMAGE _ FILE |
| JUMPERS | DESCRIPTION |
| T | FINISHED |
| 14 | DES _ UNIQUE _ NAME |
| T | CURRENT _ SET |
| F | IN _ SET _ ROLLED |
| R14R23 | REF _ DOCUMENTS |
| MA000001.PIC | PIC _ FILES |

FIG. 32

WESTINGHOUSE PRODUCT INFORMATION SYSTEM

Choose the proper aid type

| TYPE | DESCRIPTION |
|------|-------------|
| YZ | YZKDFASJSFKSJJSLSLFSJFKJBBAJYZ |
| ST | STFDASFDASFDJFSAKJddSFJSAJKSST |
| UV | UVFKSSSKFSDFKSDFSAJFDJddJAFJKKUV |
| FD | FDFLJSSKJSLSAJASLKKFSAJSDKFKFFD |
| MA | MAAJDJFSAKSASAASKJSASJSJAKASMA |
| BB | SO WHO CARES , REALLY? CD xx |
| CC | EF , efEF SO WHAT? SO WHAT????? |
| AA | It means , AB , so what else? |
| GH | GHASAJDDKJJDJSKDJKFJKJDJKFJKGH |
| WX | WXDFJSKFSFSKJSKKSJFSDJDDSJSDWX |

473→

| ↑ Up | \<PgUp> Prev page | \<Home> First page | \<Enter ⏎ > |
| ↓ Down | \<PgDn> Next page | \<End> Last page | make choice |

WESTINGHOUSE PRODUCT INFORMATION SYSTEM

Select aid begin display with     Page 1 of 1

485→

1 FIRST DESCRIP
2 SIXTH DESCRIP
3 SECOND DESCRIP
4 FIFTH DESCRIP
5 FOURTH DESCRIP
7 THIRD DESCRIP

| ↑ Up | \<PgUp> Prev page | \<Home> First page | \<Enter ⏎ > |
| ↓ Down | \<PgDn> Next page | \<End> Last page | make choice |

FIG. 36

WESTINGHOUSE PRODUCT INFORMATION SYSTEM

Page 1 of 2

| | | | |
|---|---|---|---|
| 1 FIRST DESCRIP | 9 TWENTIETH DESCR | 17 | FIFTEENTH DESC |
| 2 SIXTH DESCRIP | 10 FOURTEENTH DESC | 18 | THIRTEENTH DESC |
| 3 SECOND DESCRIP | 11 TWENTY SEVENTH | 19 | SIXTEENTH DESC |
| 4 FIFTH DESCRIP | 12 ELEVENTH DESCR | 20 | TWENTY-SECONDS |
| 5 FOURTH DESCRIP | 13 EIGHTH DESCRIP | 21 | SEVENTEENTH DSC |
| 6 SEVENTH DESCRIP | 14 TENTH DESCRIP | 22 | NINETEENTH DESC |
| 7 THIRD DESCRIP | 15 NINTH DESCRIP | 23 | TWENTY-THIRD |
| 8 THIRTIETH DESCR | 16 TWELFTH DESCRIP | 24 | EIGHTEENTH DESC |

| Move box : | Select aid : | Select directory page : | View : |
|---|---|---|---|
| ← Up   → Right | \<Space bar\> | \<PgUp\> prev   \<Home\> First | Marked aids   \<A\> All |
| ↓ Down   ← Left | Mark/unmark | \<PgDn\> next   \<End\> Last | \<Enter ⏎ \>   \<Esc\> None |

```
┌─────────────────────────────────────────────────────────────┐
│         WESTINGHOUSE PRODUCT INFORMATION NETWORW            │
├─────────────────────────────────────────────────────────────┤
│                                                             │
│   FUNCTION :  Allows you to work on the set with the        │
│               specified specs.                              │
│                                                             │
│            ┌─ Options ──────────────────┐                   │
│            │  Continue creating the set │                   │
│            │  Redo aid set              │                   │
│            │  Exit                      │                   │
│            │                            │                   │
│            └────────────────────────────┘                   │
│                                                             │
│                                                             │
│                                                             │
│                                                             │
│  For selection , use up/down arrows , then press<Enter> or  │
│                      type first letter.                     │
│                    ── Type <?> for Help ──                  │
└─────────────────────────────────────────────────────────────┘
```

FIG. 39

```
┌──────────────────────────────────────┐
│   BOARD STYLE # AND AIDSET TYPE -    │
├──────────────────────────────────────┤ ◄── 148
│                                      │
│    BOARD STYLE :       816LE1963     │
│    AID SET TYPE :         LE         │
│    ( MA , IA , ETC. )                │
│                                      │
│                                      │
│         ENTER PASSWORD :             │
│                                      │
└──────────────────────────────────────┘
```

FIG. 40

```
                    ┌─ 111
┌─────────────────────────────────────────────┐
│      WESTINGHOUSE PRODUCT INFORMATION NETWORK │
├─────────────────────────────────────────────┤
│                                             │
│   FUNCTION :  no more changes to be made at this time. │
```

FUNCTION :  no more changes to be made at this time.

– Options –
Finished Create/Alter session
Unfinished Create/Alter session
Previous Menu For selection , use up/down arrows , then press<Enter> or type first letter.
— Type <?> for Help —

FIG. 41

WESTINGHOUSE PRODUCT INFORMATION NETWORK

FUNCTION: Allows you to declare pages finished without viewing them.

– Finishing Options –
Declare page(s) finished
Review page before finishing
Exit For selection , use up/down arrows , then press<Enter> or type first letter.
— Type <?> for Help —

FIG. 42

PRODUCT INFORMATION NETWORK SYSTEM

BACKGROUND OF THE INVENTION

This invention relates generally to manufacturing systems, and more particularly to a computerized system for generating, storing, retrieving and distributing aids utilized in the manufacture of products.

The step-by-step instructions used by manufacturing personnel to fabricate, assemble and test products being produced are generally referred to as manufacturing aids. A typical manufacturing aid generally consists of an orientation image of the product being produced, exploded or detailed views of the particular area of interest, and alphanumeric text instructions describing the actions to be performed. The information contained on any particular manufacturing aid may be obtained by being copied from engineering drawings, process specifications or from assembled products. To reduce complexity to the manufacturing personnel, many manufacturing aid drawings are created to describe the entire process from start to finish in building and inspecting the product.

Problems associated with existing manufacturing aids fall into three categories; namely, concerning the creation of the manufacturing aid, control of the information contained on the manufacturing aid, and timely distribution of the aid to manufacturing personnel.

Currently, images contained on the manufacturing aid are either portions of the engineering drawing redrawn for clarity and simplicity or photographs of the actual product. These images are then assembled onto a form to which alphanumeric instructions are added and photographs made of the composite prior to laminating the photograph for distribution to the manufacturing work stations. The creation plus the checks and balances associated with this process takes significant amounts of effort with its associated costs.

With respect to the control of information contained in the manufacturing aid, a problem develops when the old information at the manufacturing work station is not removed as new updated information arrives. Outdated and obsolete information can unfortunately be used to perform and test in manufacturing because current information is unavailable or not easily available. Further, problems associated with information control develop when the old information at the manufacturing work stations is not removed as new updated information arrives. An additional problem concerns the retrieval of the unique information needed to perform a task. For example, a question can arise concerning whether or not the information contained in the manufacturing aid matches the drawing number, revision level, and status of the product for which it will be utilized.

Timely distribution of the manufacturing aid to the production personnel is another area in which problems arise with respect to the manufacturing aids. To prevent the equipment from being built utilizing erroneous information contained in existing manufacturing aids, it is important to reduce the time required to incorporate updates to the existing manufacturing aids. It is not uncommon for updated manufacturing aids to take as long as a week to arrive at the manufacturing work stations once the aids has been released for use. This time period can be even longer when the manufacturing function is remotely located. Reference documents, such as process specifications and manuals relating to standard shop practice, are usually not easily available in the shop floor. Thus, there is no mechanism in place to determine the currency of the information they contain.

SUMMARY OF THE INVENTION

To overcome the problems associated with the prior art, a new and improved product information network system was devised. The manufacturing data creation and distribution system comprises a graphics-capable display screen to which a computer is connected. The computer is capable of processing programmable instructions and creating data, and of generating graphic images on the display screen. A video camera has its output connected to the computer, and the computer includes hardware which can digitize the images transmitted by the video camera into a computer-readable form and display the digitized camera images on the display screen. A storage disk is connected to the computer for storing data received from the computer.

A plurality of microprocessor-controlled workstations each having an output screen connected thereto are networked to a microprocessor-controlled networking and file server, which in turn is connected to the storage disk for selectively retrieving data from the storage disk and for transmitting such data to the workstations for display on the workstation output screens. Also included within the computer is the capability to selectively manipulate the images received from the video camera to generate a manufacturing aid applicable to a product to be produced and to transmit the manufacturing aid to the storage disk for storage.

BRIEF DESCRIPTION OF THE DRAWINGS

Reference is now made to the description of the preferred embodiments, illustrated in the accompanying drawings in which:

FIGS. 12-28 are representations of typical screen displays which would be generated utilizing the software described in FIGS. 2-11;

FIGS. 31 and 32 are examples of record files generated by the computer software of FIGS. 29 and 30 respectively;

FIGS. 34-38 are representations of typical screen displays which would be generated by the computer software described in FIG. 33; and FIGS. 39-42 are additional representations of computer screen displays which would be generated by the computer software illustrated in FIGS. 2-11 with respect to the creation of the manufacturing aids.

DESCRIPTION OF THE PREFERRED EMBODIMENT

Figure 1:
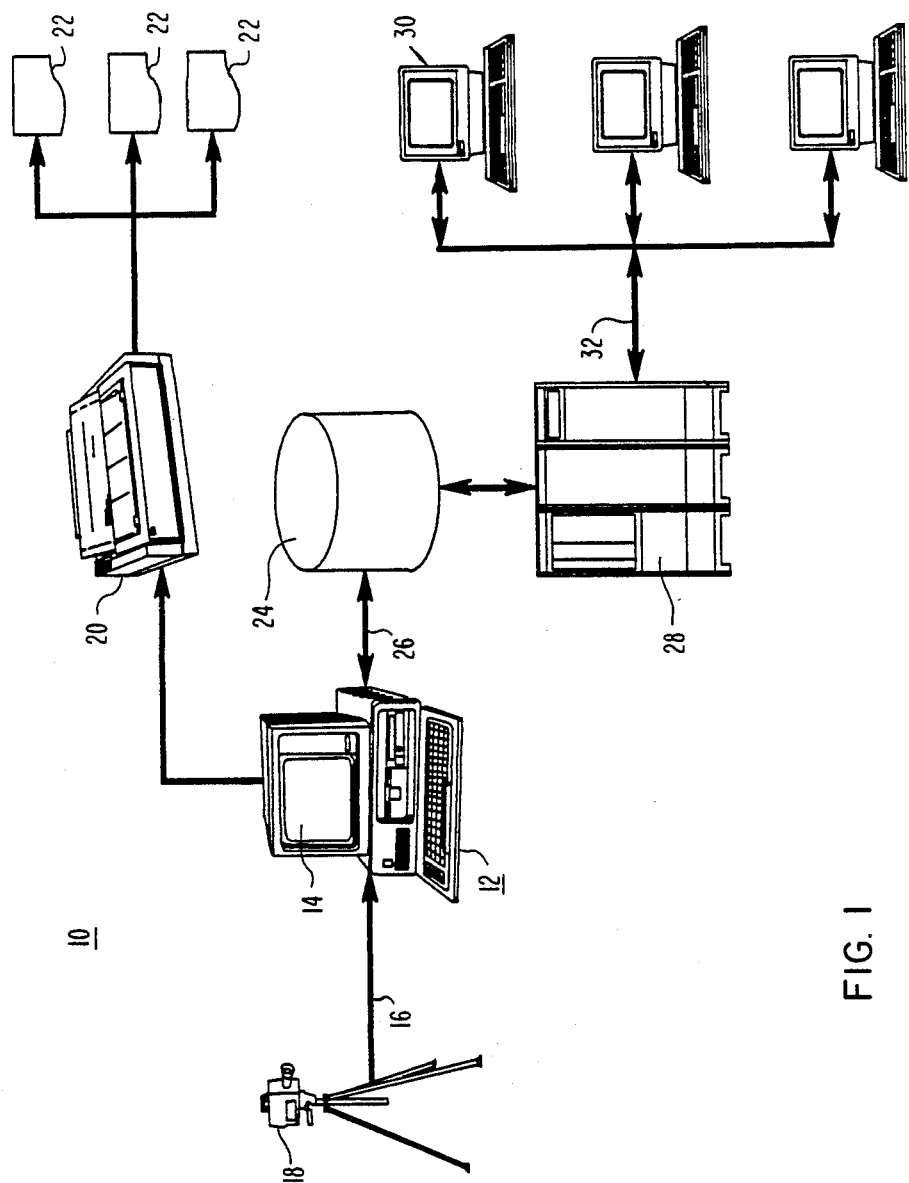
FIG. 1 is a pictorial representation of the product information network system in accordance with the teachings of this invention.

Referring now more particularly to FIG. 1, therein is illustrated pictorially the product information network system according to the teachings of this invention. The product information system 10 is comprised, and is based upon, a personal computer 12 having a display screen 14 connected thereto. The computer 12 can be, for example, the personal computer sold by the International Business Machines Corporation under the designation "AT". Connected to the computer 12, through the coaxial connection 16, is a high resolution television camera 18 which is utilized in the creation of the manufacturing aid. (For purposes of this description, the manufacturing aid will be assumed to be for the creation of a printed circuit board with its associated components placed thereon, though other types of products can also be manufactured). The television camera 18 would be used to take a picture of either an existing manufacturing aid, an actual product that is to be manufactured, or engineering drawings, for example. The television camera 18 should be a high resolution camera cable of a resolution of 1000 lines by 1000 columns. The television camera 18 is connected to a video digitizing card (not shown) which would be included within the computer 12. The digitizing card transforms the image produced by the camera 18 into a series of digital numbers that represent the intensity level of each pixel that comprises the picture. This series of digital numbers is organized into a file in the computer memory for later processing. The digitizing card can be, for example, that card sold by Chorus Data Systems Inc. under the trademark PC-EYE. This digitizing card should be capable of providing a resolution of at least 512 pixels horizontally by 512 lines vertically or, optionally, 1024 by 1024 resolution.

Also included within the computer 12 is a graphics adapter board (not shown) which is utilized for displaying on the computer screen the representation of the image digitized by the digitizing card. The graphics adapter board also can be utilized for further processing of the digitized image as will be hereinafter described. Preferably, the graphics board will provide color or greyscale images on a color computer monitor screen 14. A graphics adapter board which has provided satisfactory results is the board sold by the Imagraph Corporation under the trademark Imagraph.

Connected to the computer 12 is a graphics printer 20 which can be utilize to print the screen images and provide hard copy images 22 of the manufacturing aids which can be distributed to the various work stations.

Because the digitized images require large amounts of memory, the preferred system includes a separate storage disc 24 to store the files produced by the digitizing card. This storage disc 24 could be, for example, a high capacity magnetic storage disc or an optical write once, read mostly drive and its associated storage cartridges. The storage disc 24 would be connected via cables 26 to an output of the personal computer 12. Also connected to the storage disc 24 is a file server and network controller 28, which functions to distribute the electronically stored manufacturing aids to the work station computers 30 through a local area network 32. The file server and network controller would preferably be a 386 based system. The distribution could be over the lines 32 which could be, for example, that sold under the trade name Ethernet. The individual work stations 30 would be, for example, AT(TM) computers sold by International Business Machines Corporation and each computer 30 would contain there in a graphics adaptor board similarly to that installed within the personal computer 12, and optionally with a bar code reader (not shown) for ease in manufacturing personnel input.

The product information network system 10 described can be considered to be comprised of three distinct areas with respect to any manufacturing aid; and first area, comprised of the television camera 18, and computer 12, the graphics printer 20 and the storage disc 24 are related to the creation of the manufacturing aid; the storage disc 24 and the file server and network controller 28 are related to the storage and retrieval of the manufacturing aid; and the file server network controller 28 and the individual work station computers 30 could be considered to be part of the distribution of the manufacturing aid. The hard copy images 22 likewise would be considered part of the distribution system. For ease and understanding the operation of the system, the following description will be segregated into the three individual areas, although it is to be understood that the system according to this invention is the integration of these three separate areas into a complete manufacturing product information network.

Figure 2:
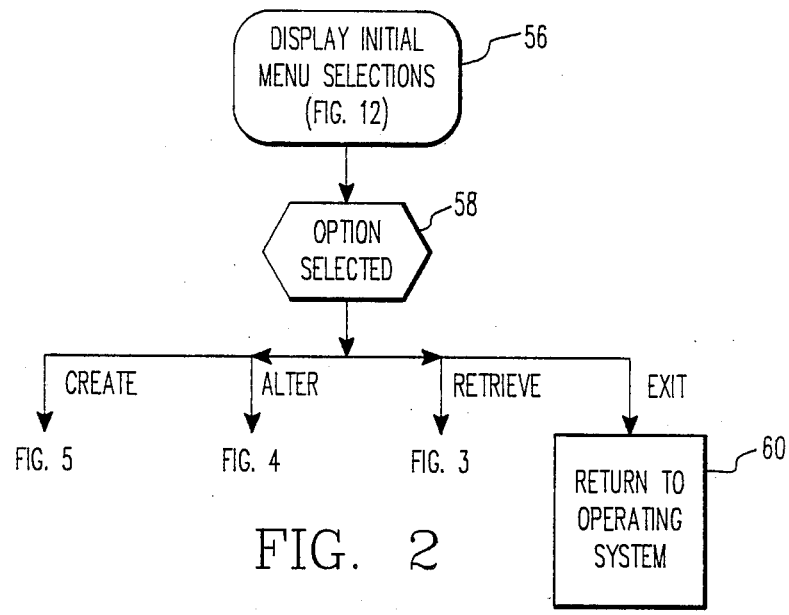
FIGS. 2, 3, 4A, 4B and 5-11 are flow diagrams of the computer software utilized for the creation phase of the manufacturing aids.

Referring now to FIG. 2, therein is shown the flow diagramming for the computer software when the creation function is invoked.

Figure 3:
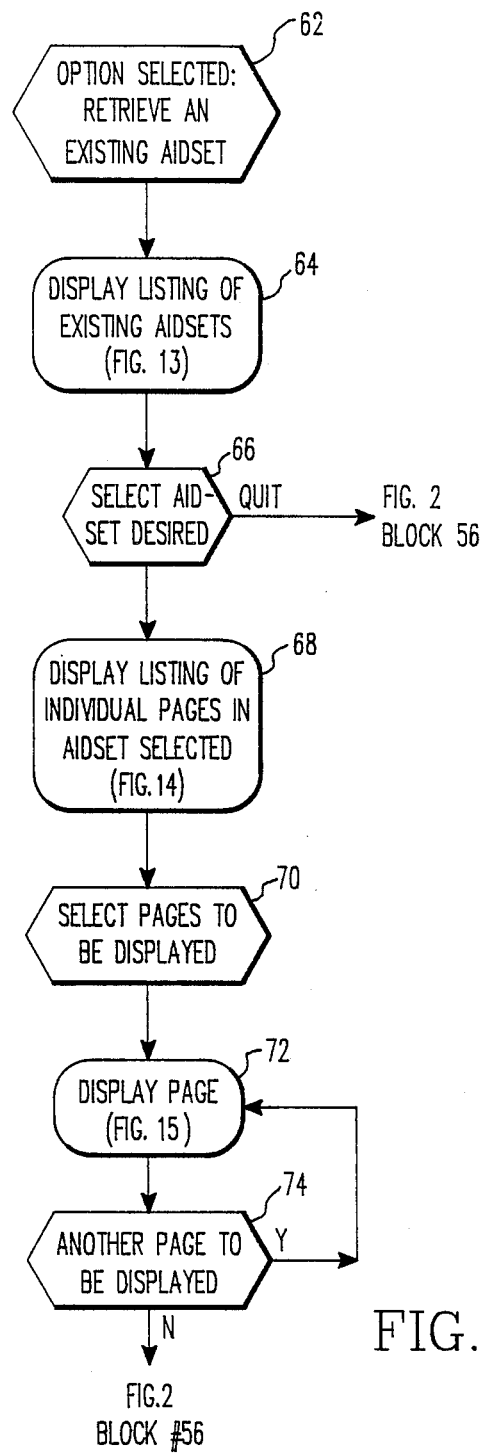

After these initialization, the programming displays 56 the initial menu selections, as illustrated on the screen display 57 in FIG. 12. As can be seen from this display 57, the initial menu selections enable the user to either create a new aid set, alter an existing aid set, retrieve an existing aid set, or exit from the creation function. The user then selects 58 one of these options (FIG. 2). Depending upon which option is selected at step 58, the computer software can branch to one of these four different areas. If the option selected 58 is to exit, the software exits the creation program and returns the computer 12 to the main operating system 60. If the option selected 58 is to retrieve an existing aid set, the software performs as described in the flowchart beginning on FIG. 3.

Once the option selected has been to retrieve a existing aid set 62, the computer 12 displays 64 a listing of existing aid sets, an example of which is shown in the display screen 65 illustrated in FIG. 13. The user then selects 66 the aid set desired or may decide to quit this option. If the user decides to quit the option to retrieve an existing aid set, the programming returns to the display initial menu selections point in the software, element 56 in FIG. 2.

Figure 15:
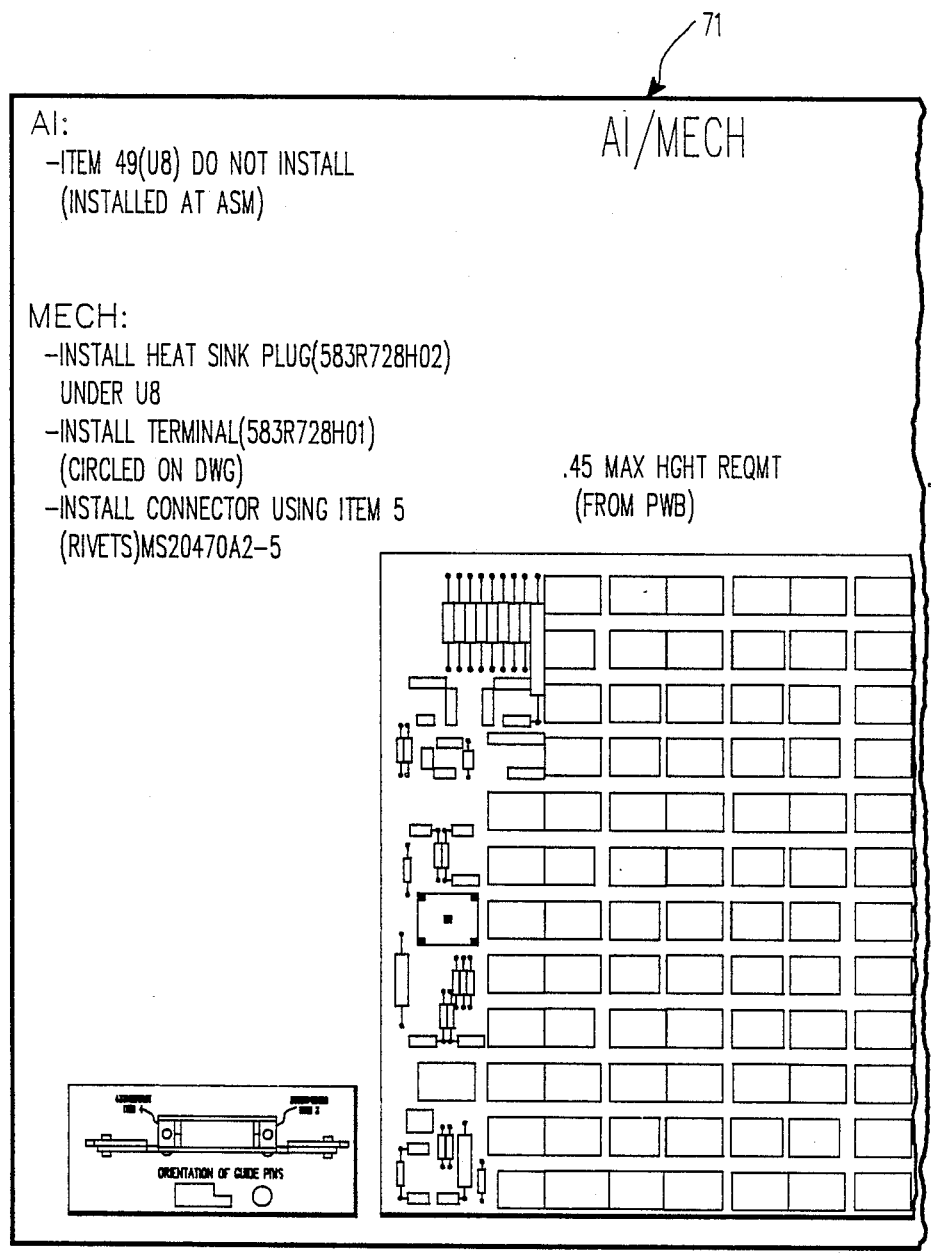

Once the user has selected 66 the particular aid set which is desired to be retrieved, the computer displays 68 a listing of the individual pages in the aid set selected. In the event that the set has more than one revision level, the programming will inquire as to which revision level the user desires to have displayed. A sample display 67 of the screen generated by this step 68 is illustrated in FIG. 14. At this point, the user selects 70 the pages to be displayed. Following this selection 70, the software retrieves the information from the data base and displays 72 the manufacturing aid page requested. A sample display 71 of the screen generated during this step 72 is illustrated in FIG. 15. After this page 71 has been displayed, the software determines 74 whether or not there are additional pages to be displayed. If so, the software returns to the display page step 72 and displays the next page in order. If no other page is to be displayed, the software returns to the main menu, element 56 of FIG. 2. Thus, this is the functional operation of the retrieve an existing aid set option.

Figure 4A:
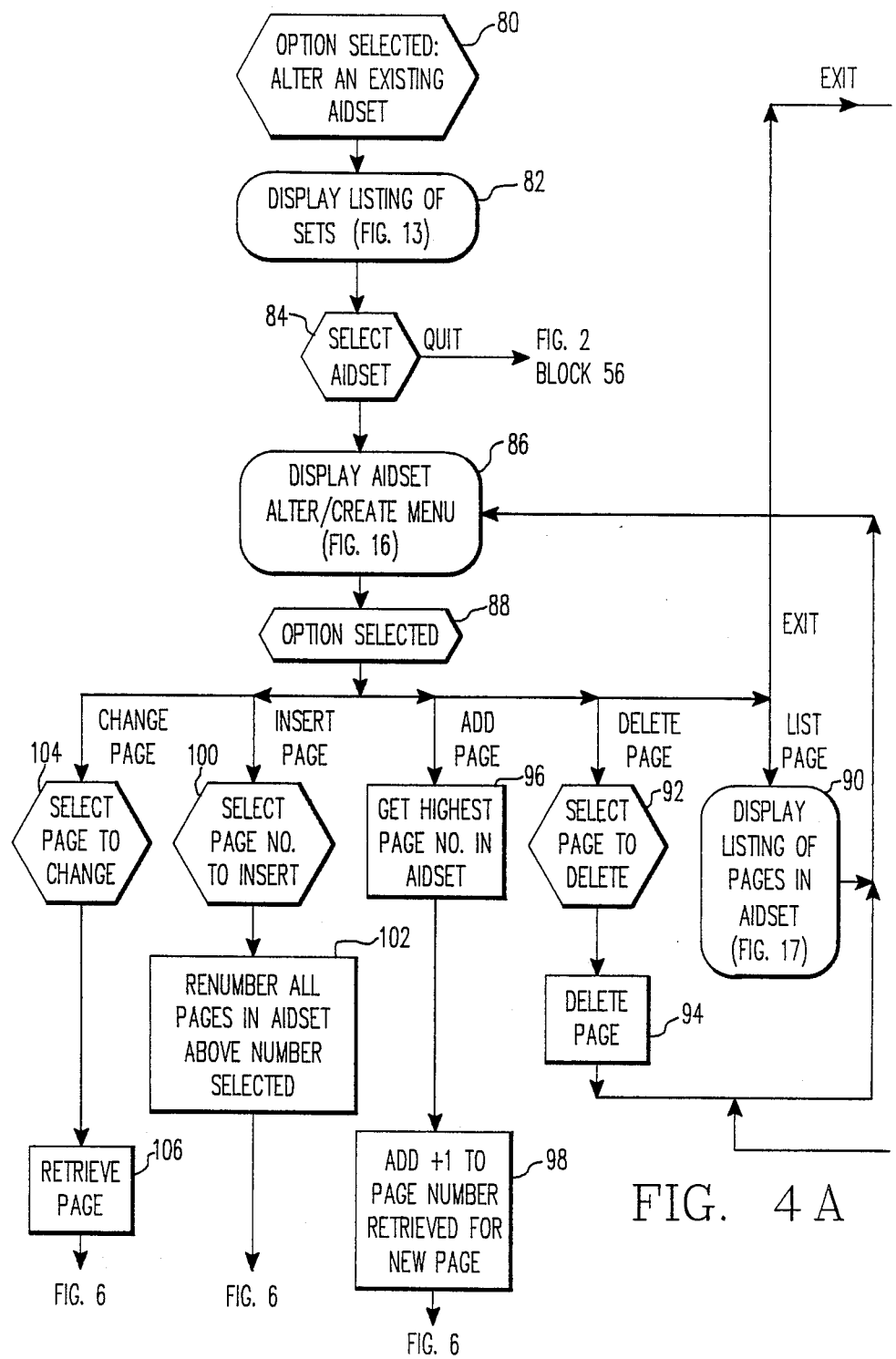
Figure 4B:
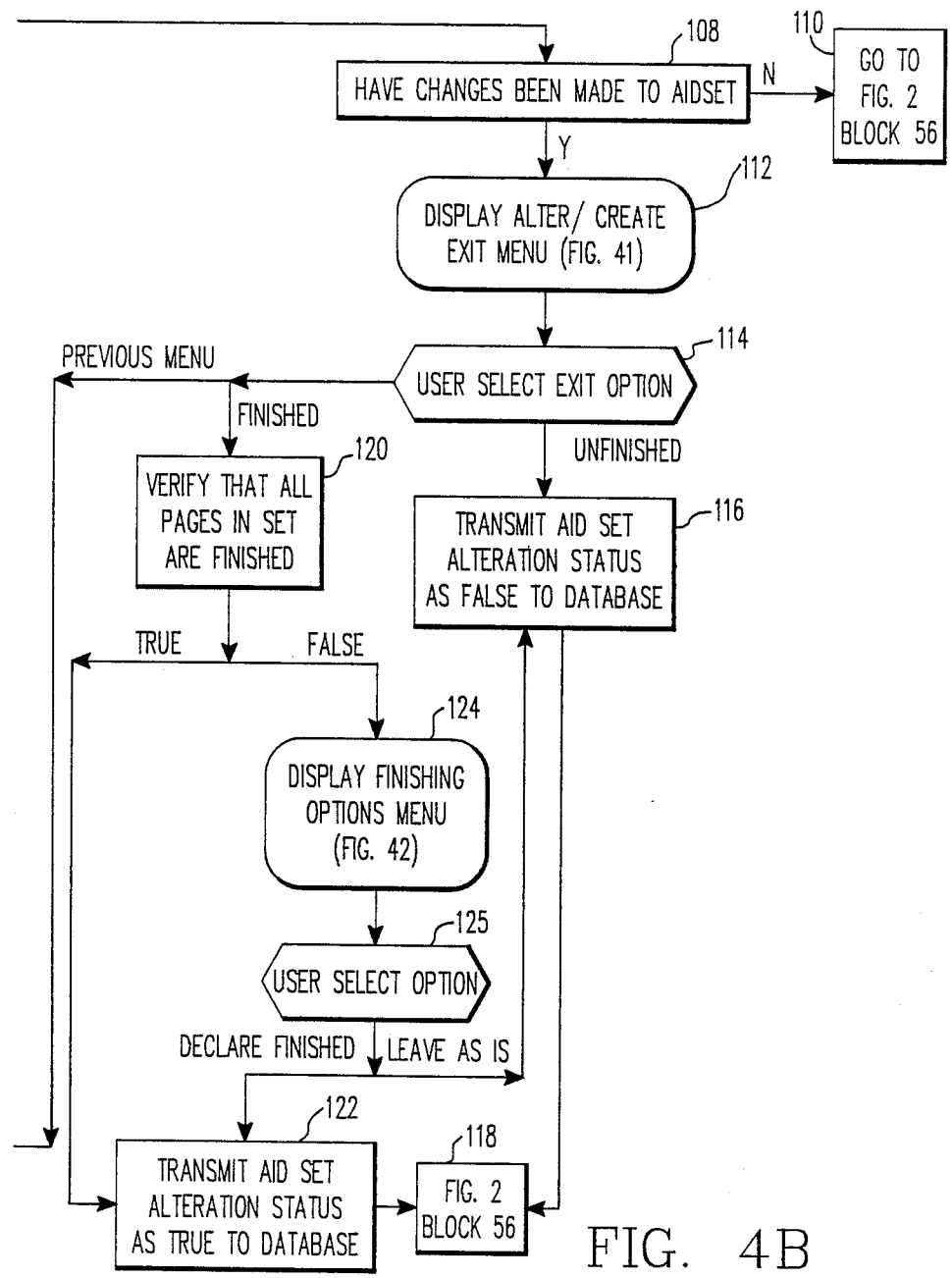

If, instead of retrieving an existing aid set, the option selected 58 is to alter an existing aid set 80, the software will perform as indicated by the flow chart beginning in FIG. 4. The computer will display 82 a listing of the existing aid sets, a sample screen 65 of which is illustrated in FIG. 13. The user then selects 84 one of the aid sets to alter. The programming then displays 86 the aid set alter/create menu 85 illustrated in FIG. 16. The user then has the option to select 88 any of the functions available from this menu 85. If the option selected 88 is to view an existing page, the computer will display 90 a listing of pages in the current aid set, a sample display of which is illustrated as the screen 89 in FIG. 17. After this listing 89 is shown, the computer 12 returns to the step 86 causing the screen 14 to display the aid set alter/create menu 85.

If the option selected 88 is to delete a page, the user is requested to select 92 the page to delete. After this selection 92 has taken place, the programming deletes 94 the page from the aid set records in the data base by changing the corresponding record in the data base so that the record will indicate that the page is not in the current aid set, and returns the user to the aid set alter/-create menu display step 86.

Figure 6:
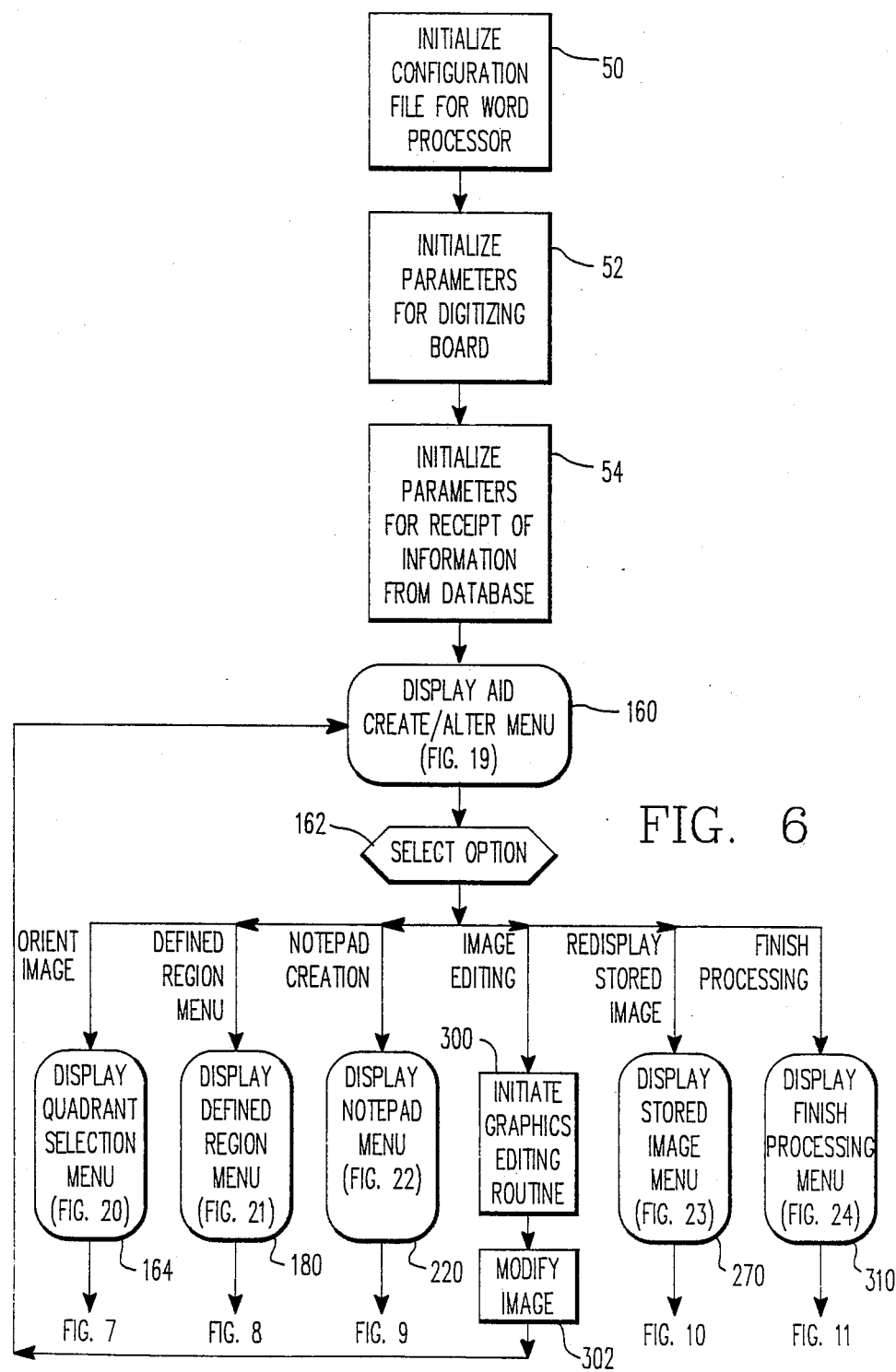

If the option selected 88 is to add a page to the end of the aid set, the software obtains 96 from the data base program the highest number of pages in the aid set, then adds 98 one to that page number retrieved for the new page, and then continues processing the program as shown by the flow chart beginning on FIG. 6. The functions performed at this point will be described hereinafter, as other options also lead to the FIG. 6 functions.

If the option selected 88 is to insert a new page into the aid set, the user is requested to select 100 the page number of the page to insert. The software then renumbers 102 all pages in the aid set above the number selected so as to provide room for the new, inserted page. After this step 102 is accomplished the software then continues processing with the functions described with respect to the flowchart illustrated in FIG. 6.

If the option selected 88 is to alter an existing page, the user is requested to select 104 the page which is desired to be changed. The user can elect either to use an existing page or may decide to use a new page. The software then retrieves 106 the page from the information contained in the data base and continues processing as shown in FIG. 6.

If the option selected 88 is to exit, the software determines 108 whether changes have been made to the aid set. If no changes had been made to the aid set, processing returns 110 to the initial menu display 56 in FIG. 2. If changes had been made to the aid set, the computer 12 will display 112 the alter/create exit menu 111 illustrated in FIG. 41. At this point, the user selects 114 options as to how to exit this session. The main options available to the user at this point are to declare the altering session either as a finished, and hence completed aid set and thus a new revision level of the aid set, or to declare the aid set as unfinished or still to be completed aid set at the particular revision level. If the user selects 114 the option to declare the aid set as an unfinished air set, the computer 12 transmits 116 to the data base an aid set alteration status as false. This informs subsequent accesses to the data base that the aid set or the altering session is not completed. After transmitting such alteration status 116, the software returns 118 to the initial menu display 56 in FIG. 2.

If, however, the user desired to declare the aid set as finished 114, the software verifies that all of the pages in the aid set are and have been declared as finished 120. If it is true that all pages have been declared finished 120, then the software transmits 122 to the data base an aid set alteration status of "true". This then informs subsequent accesses to the data base that the aid set has been completed. After transmitting the alteration status 122 to the data base, the software returns 118 to the initial menu selections, element 56 in FIG. 2.

If the verification 120 shows that all the pages in the aid set have not been declared finished, or in other words that the verification shows that at least one page in the aid set is unfinished, then the programming will display 124 the finishing options menu 123 illustrated in FIG. 42. At that point, the user can either decide 125 to declare the other pages finished, or to leave their status as is. If the decision 125 is to declare the other pages finished, then the programming will transmit to the data base the information that those pages are now finished and return the status 122 to the data base that the aid set is completed. If the user decides to leave the other pages as they were, that is, an unfinished status, the programming will transmit 116 to the data base an aid set alteration status as false, and return 118 to the initial menu selections 56 of FIG. 2.

Figure 5:
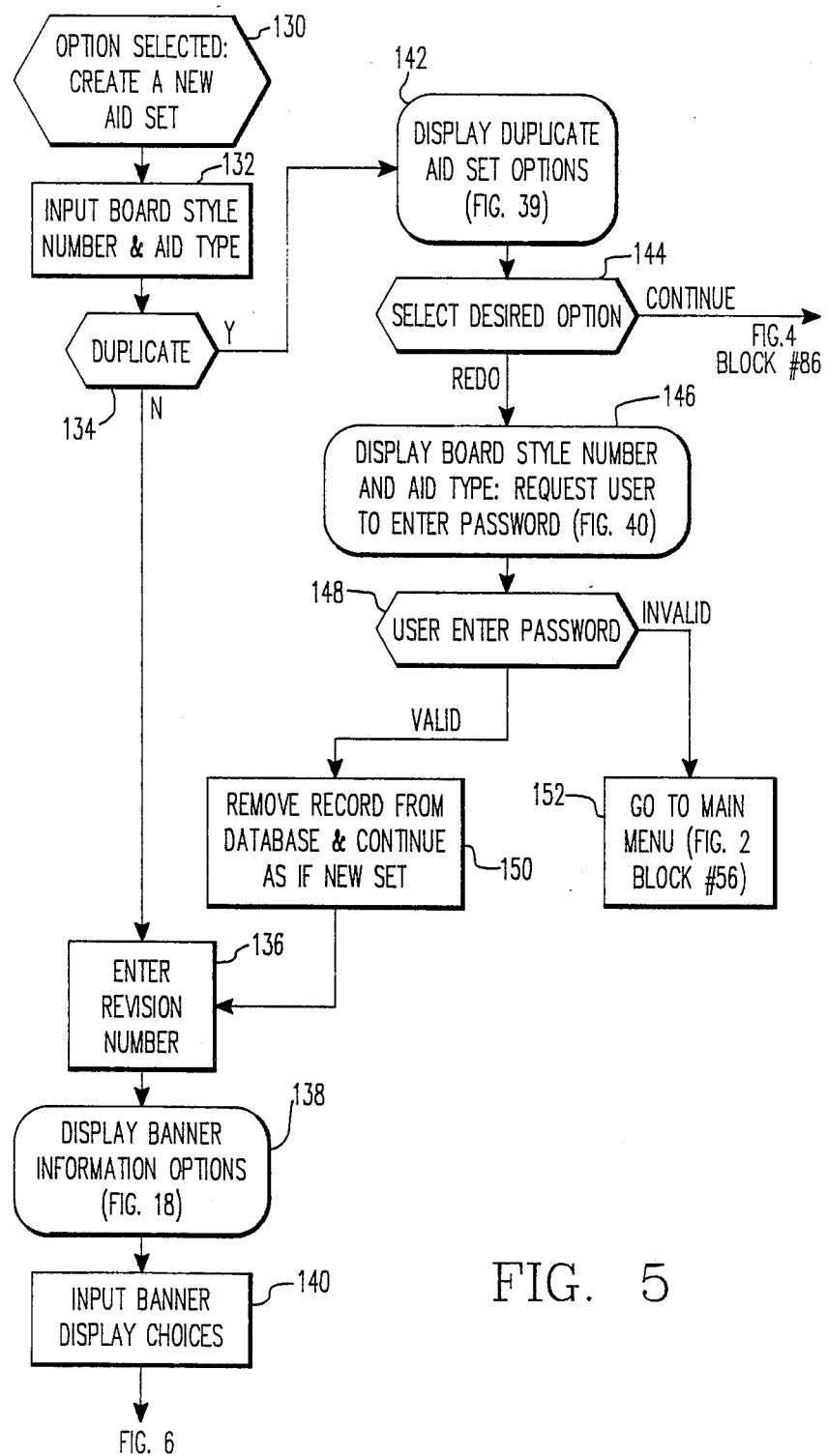
Figure 18:
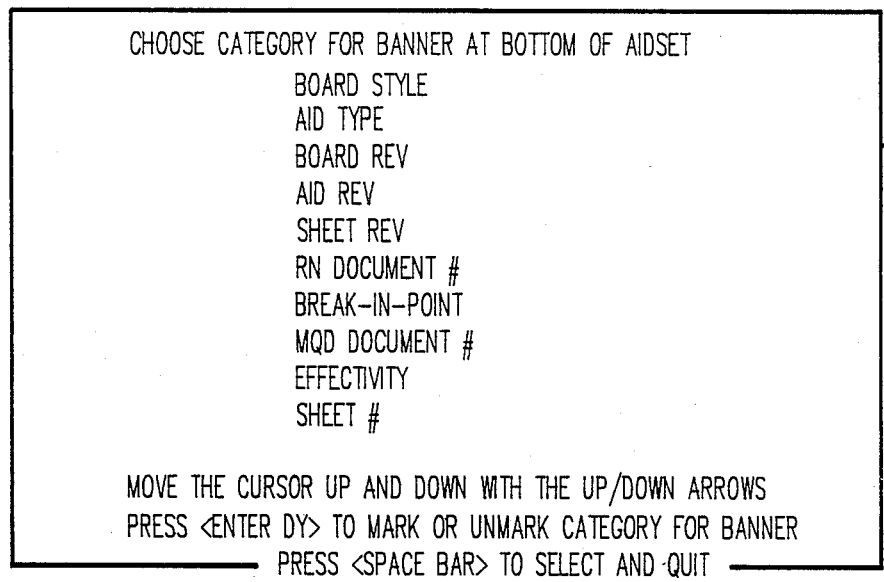

If, when the initial menu was displayed 54 (FIG. 2), the option selected 58 was to create 130 (FIG. 5) a new aid set, the user is requested 132 to input the board style number and aid type. The programming checks 134 to determine whether or not this board style number and aid type is a duplicate. If it is not, the user is then requested to enter a revision level 136. After the user enters the revision level 136, the computer will display 138 the banner information options screen 137 of FIG. 18. The user then chooses 140 which categories of information he/she desires to be illustrated along the bottom banner on the to be created manufacturing aid. After the user inputs the choices 140, processing continues with the functions illustrated in FIG. 6.

If the board style number and aid type input by the user 132 were a duplicate 134, the programming will display 142 on the screen the duplicate aid set options screen 141 illustrated in FIG. 39. The user is then given the option to select 144 which course of action is desired. If it is to continue creating the set, the program moves on to the functions beginning with the display of the aid set alter/create menu 86 in FIG. 4A. If the option selected 144 is to redo the aid set, the computer 12 will display 146 the screen 148 illustrated in FIG. 40. This screen sets forth the board style number and aid type that the user had input earlier 132, and requests the user to enter an appropriate password 148 which will limit access to only those authorized to redo the aid set. If the user enters 148 a valid password, the programming will remove 150 the existing record from the data base and continue with the programming as if the board style number and aid set were a new aid set. That is, the user is then requested to enter a revision number 136 and to choose the banner display choices 140 for further processing. If the user enters a password 148 that is invalid, and the user is not entitled to redo the aid set, the programming will return 152 to the initial menu display 56 of FIG. 2.

Figure 19:
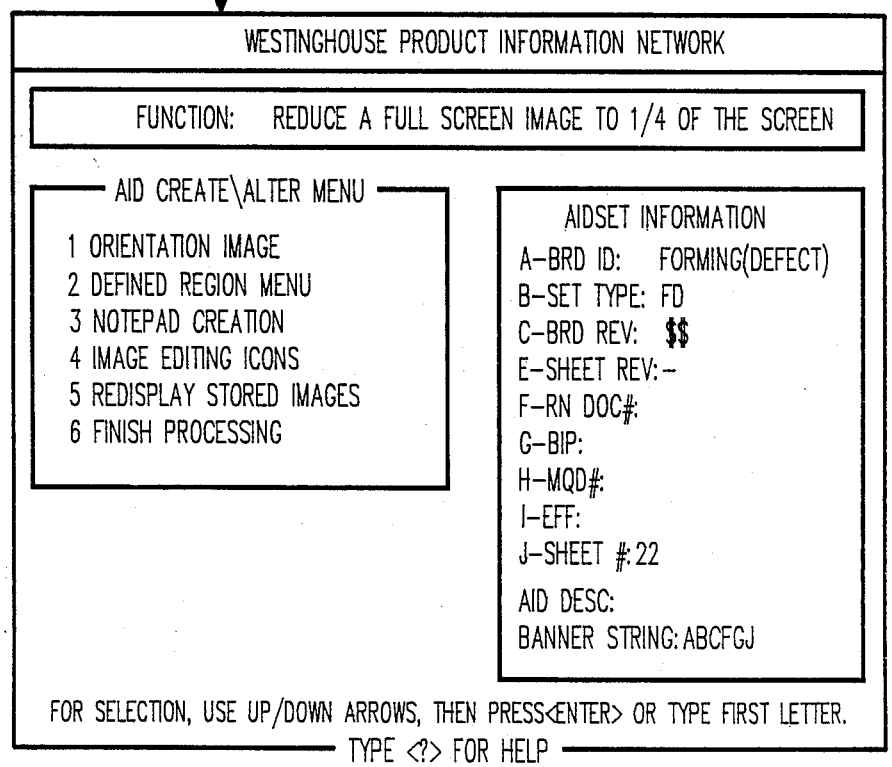

As was previously described, numerous paths through the programming converge at the creation functions illustrated beginning at FIG. 6. In particular, at this point the software in the computer 12 initializes the configuration file 50 for the word processor which will enable the use of textual notes on the manufacturing aid. The parameters for the digitizing board are initialized 52 so as to enable the computer 12 to capture the images from the television camera 18. The computer 12 also initializes the parameters 54 that it receives from the data base so that the software will be able to receive information from the data base concerning the various manufacturing aids. The computer will then display 160 the aid create/alter menu 159 illustrated in FIG. 19. After this menu 159 is displayed 160, the user has numerous options to select 162. The user can decide to either create an orientation image, to work with a captured image in a defined area, to add text to the manufacturing aid, to do image editing on the displayed graphics image, to redisplay a previously stored image, or to finish processing on the aid page.

Figure 7:
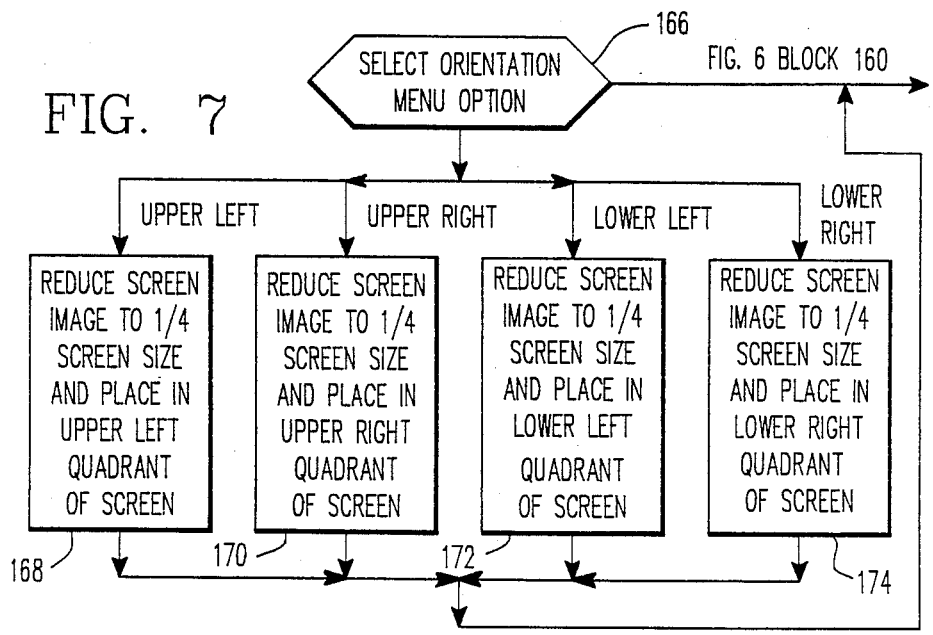
Figure 20:
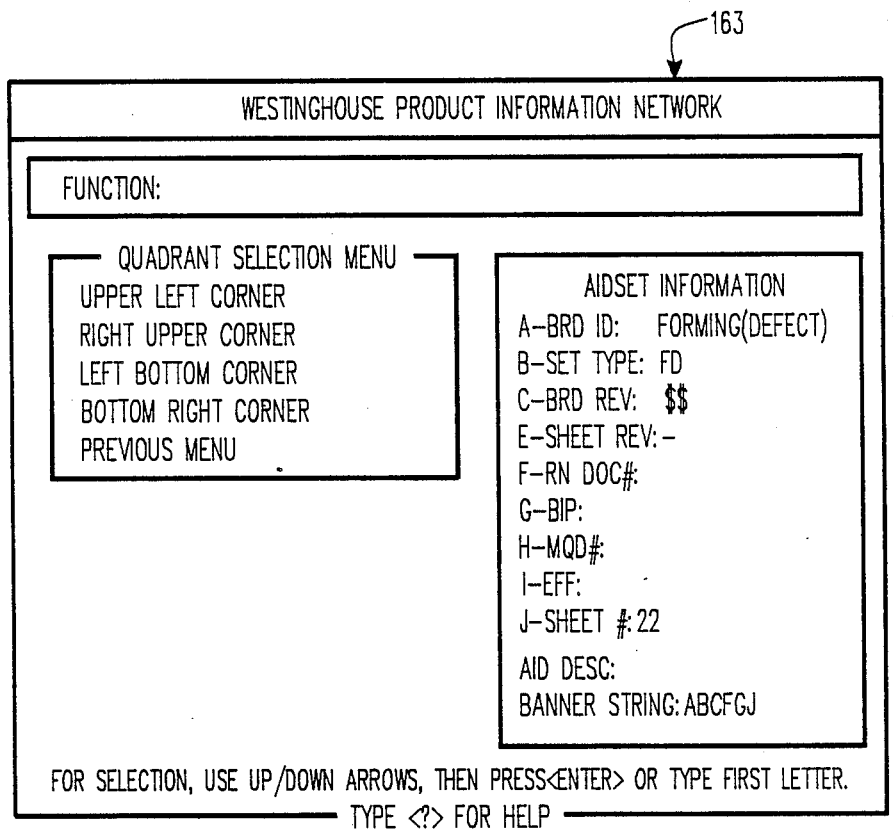

If the option selected 162 is to create an orientation image, the computer 12 will display 164 the quadrant selection menu 163 illustrated in FIG. 20. Orientation image creation involves taking the existing full screen image generated by the television camera 18 and displayed on the screen 14, and shrinking it to a fraction of its size and placing it in one quadrant of the screen. The menu 163 in FIG. 20 gives the user the option 166 (FIG. 7) as to where the user desires the image to be located. If it is desired to put the image in the upper left hand corner of the screen, the computer will reduce the screen image 168 to, of its full screen size and place it in the upper left quadrant of the screen. A selection 166 to put the image in the upper right 170 will result in the computer reducing the screen image to, screen size and placing it in the upper right quadrant of the screen.

Similarly, if the decision 166 is to place the orientation image in either the lower left 172 or lower right 174 quadrants of the screen 14, the computer 12 will then reduce the screen image to, full screen and place it in either the lower left or lower right quadrant of the screen 14. After any of these options have been selected, the programming will then return to displaying 160 (FIG. 6) the aid create/alter menu.

Figure 8:
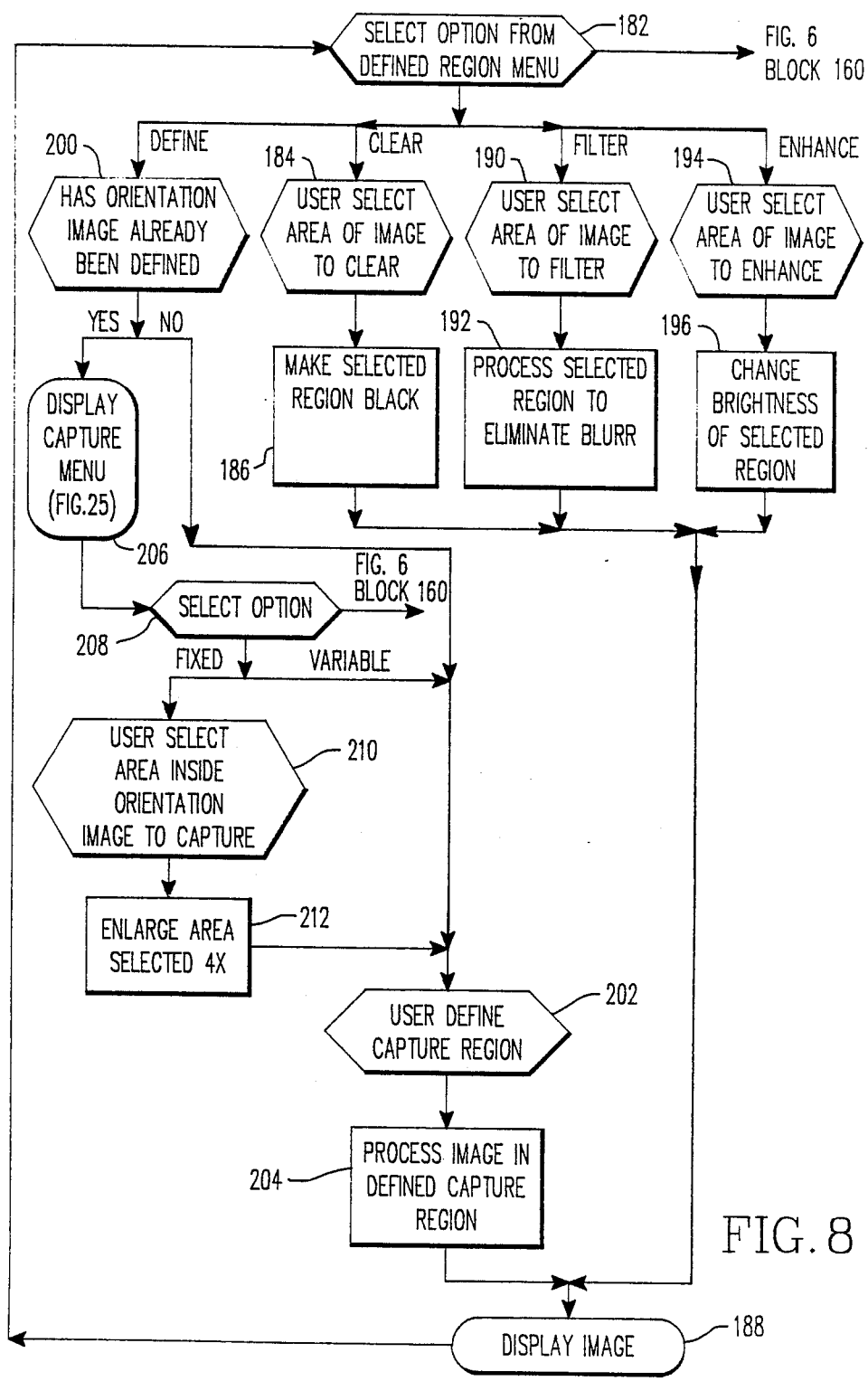

If the option selected 162 is to work with a defined region, the programming will display 180 the defined region menu 181 illustrated in FIG. 21. The user then has the option 182 (FIG. 8) to either define a capture region, clear such a region or filter or enhance a region. If the option is to clear a region, the user selects 184 an area of the image to clear. After this selection 184 is made, the programming then makes the selected region black 186, and displays 188 the altered region. The user is then returned to the defined region menu 182.

If the option selected 182 is to filter a defined region, the user is requested to select 190 an area of the image to filter. Once this is done, the programming in the computer will process the selected region 192 to eliminate blur lines and fuzziness which may be present within the selected area. After this region has been processed 192, the image is displayed 188 and the user is returned to the defined region menu 182.

If the option selected is to enhance a defined region, the user selects 194 the area of the image to enhance. The processing then changes the brightness 196 of the selected region, making it brighter than, or darker than, surrounding areas. The image, as before, is then displayed 188, and the user is returned to the defined region menu 182.

Figure 25:
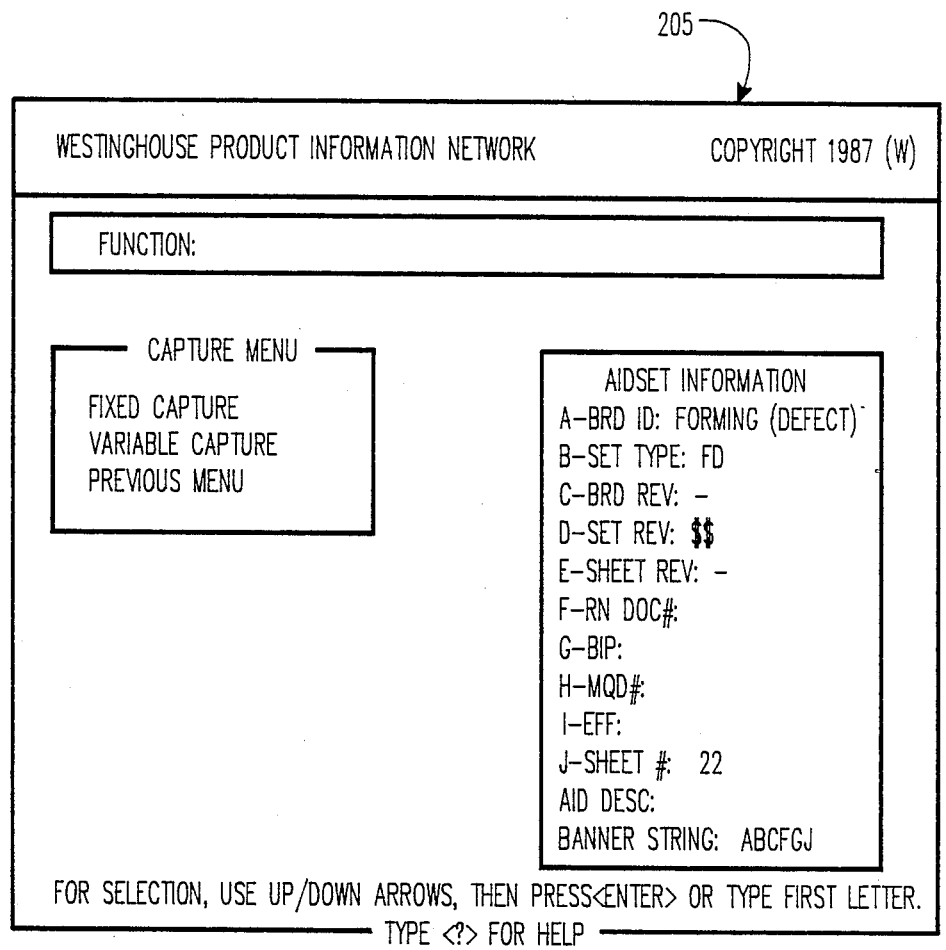

If the option selected has been to define a capture region, the programming must first determine 200 whether or not an orientation image has already been defined. If it has not, the user is requested 202 to define the capture region, and the programming will take the full screen image produced by the television camera 18 and process such image 204 into the defined capture region. If, however, the orientation image has already been defined 200, the programming will display 206 the region capture menu 205 illustrated in FIG. 25 and the user will be requested to select an option 208. If the option selected 208 is to quit, the user is returned to the aid create/alter menu 160 in FIG. 6. If the option selected 208 is to have a variable capture, the user is requested 202 to define the capture region, and the computer will process 204 the image in the defined region. If, however, the option selected 208 is to utilize a fixed capture, the user is requested 210 to select the area inside the full orientation image to capture. The processing will then enlarge 212 the area selected by a magnitude of four, process it 202 in the user defined capture region and eventually display 188 the image. The user is eventually returned to the defined region menu 182. Exiting from the defined region menu 182 returns the user to the aid create/alter menu 160 in FIG. 6.

Figure 9:
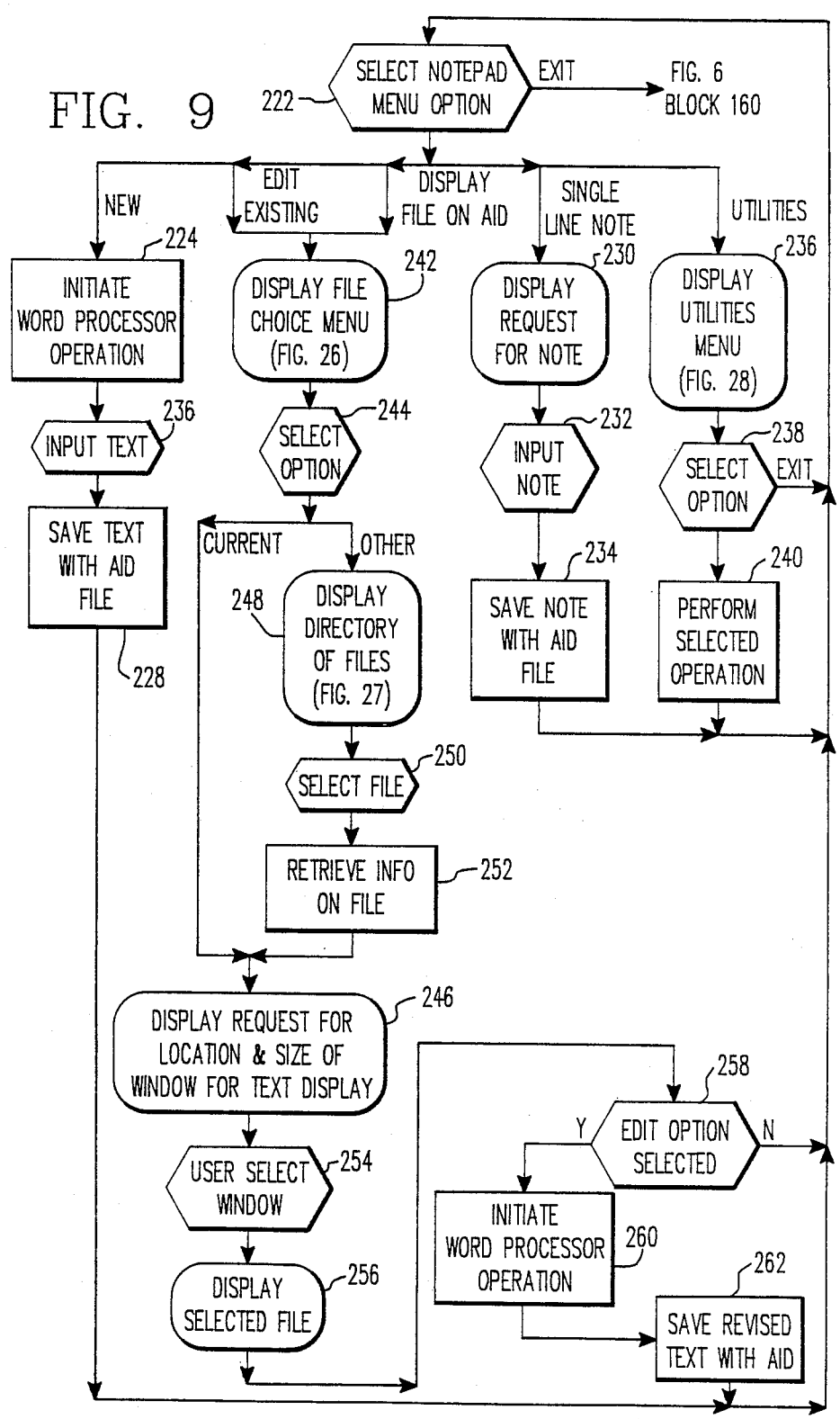

If the option selected 162 (FIG. 6) is to create a note, the note pad menu 219 (FIG. 22) is displayed 220 (FIG. 6) and the user is given the option 222 (FIG. 9) as to what functions to be performed next. If the option selected 222 is to create a new note, the programming will initiate operation 224 of a word processor which can be stored on the computer 12. The user then inputs the desired text 226 and after such text has been entered, the computer 12 will save the text 228 in the main data base along with the aid file. The user is then returned to the note pad menu 222.

If the user desires to generate only a single line note, there will be displayed 230 a request for the note. The user then inputs 232 the note desired, and this note is then saved 234 in the data base with the aid file, and the user is returned to the note pad menu selection 222.

Figure 28:
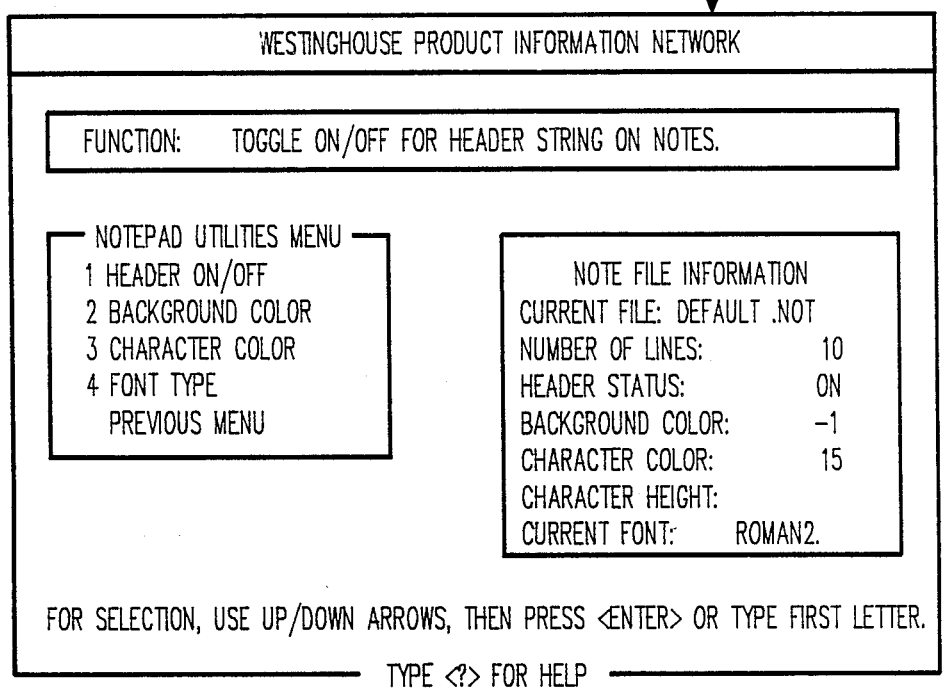

If, the user desires to utilize one of the note pad utilities, the programming will display 236 the utilities menu 235 illustrated in FIG. 28. The user is then requested to select 238 the option desired such as turning the header on or off or changing the font type or colors and the programming will perform 240 the selected option according to the user's inputs. After the operations have been selected or an exit is desired, the user is returned to the note pad menu 222.

If the option selected 222 is to either edit or display an existing file, the programming will display 242 the file choice menu 241 illustrated in FIG. 26. The user is then requested to select 244 the option desired. If the option desired is to select the current file, the programming will display a request 246 for the location and size of the window in which the text will be displayed. However, if the selected option 244 is to choose a different file (option file manager), the programming will display 248 the directory of files existing, a sample 247 of which is illustrated in FIG. 27. The user then chooses 250 which file he/she desires, and the programming retrieves 252 the existing information on the file from the data base. As before, the programming then displays the request 246 for the location and size of the window for the text display. The user then selects 254 the window desired, and into this window is displayed the selected file 256.

If the edit option were selected 258, word processor operation is initiated 260 and after completion of word processing operation, the revised text is saved with the aid 262. After that is done, or if the edit option had not been selected 258, the user is returned to the note pad menu 222. Exiting from the note pad menu 222 returns the user to the aid create/alter menu 160 in FIG. 6.

Figure 10:
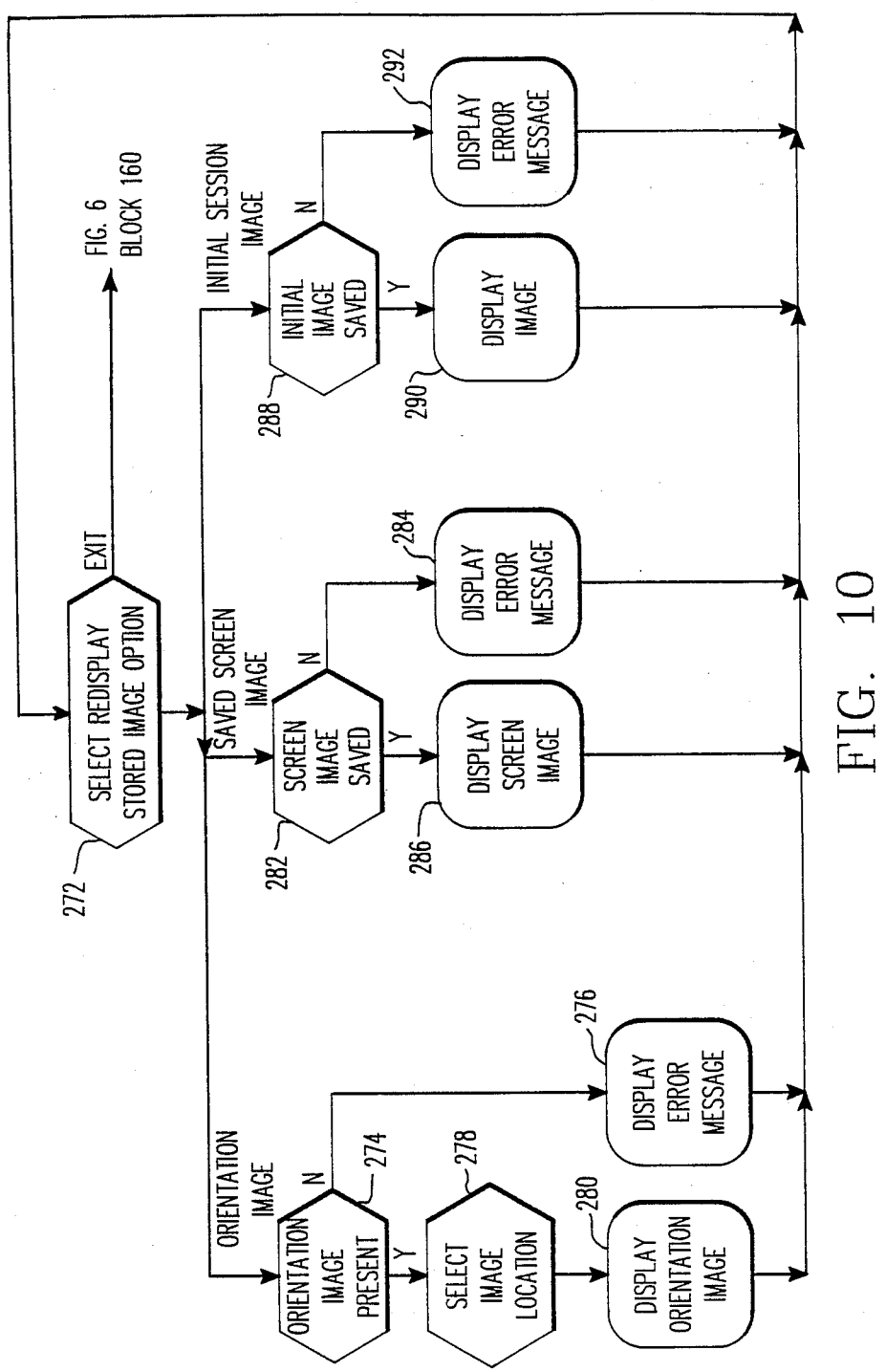

If, when the aid create/alter menu is displayed 160 (FIG. 6), the user selects the option 162 to redisplay a stored image, a stored image menu is displayed 270. The menu, illustrated as the screen 271 in FIG. 23, enables the user to select three different types of images to be displayed. Continuing now according to the flowchart illustrated in FIG. 10, the user selects 272 which image is desired. If an orientation image is desired, the software will check 274 to determine whether or not an orientation image is present. If no orientation image is present, the software will display 276 on the computer screen a message indicating the error and then will return the user to the selection option 272. If there is an orientation image present, the user is requested to select 278 where on the screen the image should be displayed. Once selected 278, the software will display 280 the orientation image in the desired locale.

If the user selected 272 the option to have a saved screen image displayed, the software will, again, check 282 to determine whether or not a screen image has been saved. If no screen image has been saved, the computer screen 14 will display 284 an error message indicating that no screen image has been saved. If a screen image has been saved, the software will generate the screen image and display it 286 on the screen 14.

If the user selects 272 the option to have the initial session image displayed, the software will verify 288 whether or not the initial image had been saved. If it had, the screen will display 290 the initial image which had been saved. If not, the screen 14 will display 292 an error message indicating that the initial image had not been saved. After all these displays, the user is returned to the option selection step 272. Exiting from that option returns the user to the aid create/alter menu 160 in FIG. 6.

If, while viewing the aid create/alter menu 160 (FIG. 6), the user selects 162 the option to perform image editing, the software will initiate operation of an appropriate graphics editing package which has been previously stored in the computer. One package which has been found to be adequate for these needs is that sold by Media Cybernetics, Inc. under the trademark Dr. Halo. Other appropriate graphics editing packages may also be utilized, if desired. Once the graphics editing routine 300 has been initiated, the user can then modify 302 the image displayed on the screen as desired, and when completed, will be returned to the aid create/alter menu 160.

Figure 11:
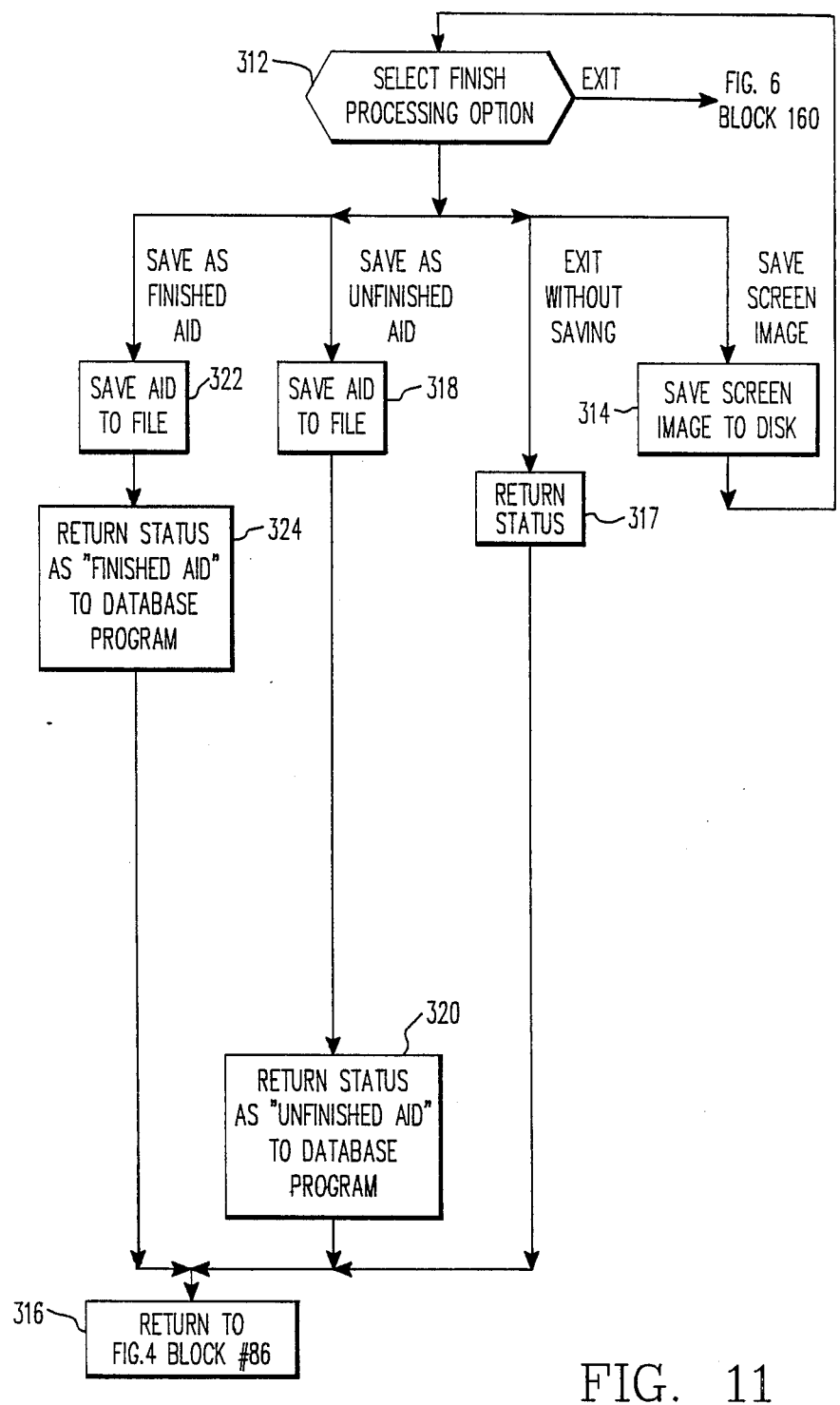

The final option available to the user when viewing the aid create/alter menu 160 is to select 162 the option to finish processing on the aid. If this option is selected, the software will generate a display 310 of the finish processing menu 311 illustrated in FIG. 24. The user can then select 312 (FIG. 11) the option desired. As one option, the user can select 312 to save the screen image as a reuseable screen. If this option is chosen, the software will save the screen image 314 to storage disk 24 and will enable the user to subsequently recall the screen image from the aid create/alter menu 160 (FIG. 6). After the image has been saved to disk, the user is returned to the finish processing menu (FIG. 24) for further option selection 312.

If the user elects to exit without saving the image, the programming 317 deletes the record it had inserted in the data base if the operation selected 88 (FIG. 4A) were to add a page, or will consider the page unchanged of the operation selected 88 were to alter a page. The user is then returned to the display of the aid set alter/create menu 86 (FIG. 4A).

If the option selected 312 (FIG. 11) is to save the aid as an unfinished aid, the software will save 318 the aid to file, and return 320 a status code to the data base program indicating that the aid is an unfinished aid. After the status has been transmitted, the user is returned to the display of the aid set alter/create menu 86 (FIG. 4A).

If the user elects 312 to save the aid as a finished aid, the aid is saved to its appropriate file 322. The software will also return a status to the data base program 324 that the aid should be considered as a finished aid.

It has previously been described that the system 10 utilizes a computer software data base to store information concerning the various manufacturing aids which are generated by the product information network 10. This data base is preferably a relational-type data base which is user programmable to perform various retrieval functions as desired. One such program which has been utilized effectively in the system 10 of this invention is that sold by the Ashton-Tate Corporation under the name DBase III Plus.

Figure 29:
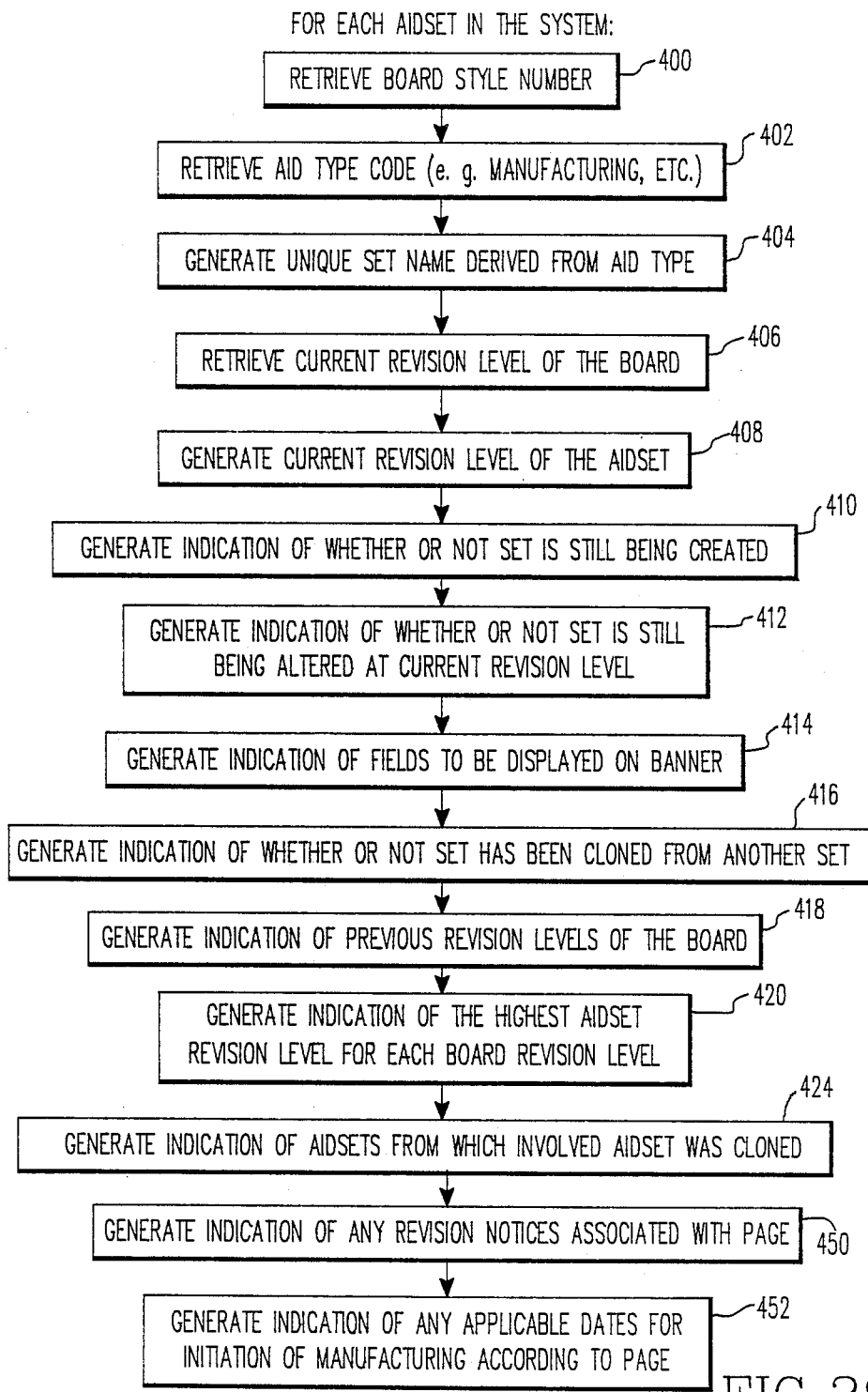
FIGS. 29-30 are flow diagrams of the computer software utilized for storing and retrieving information concerning the manufacturing aids generated by the software described in FIGS. 2-11.

Referring now more particularly to FIGS. 29 and 31, therein is illustrated a flow diagram (FIG. 29) and an example (FIG. 31) of a typical record concerning each aid set in the product information network system 10. The sample record would be, for example, for the manufacture of a printed circuit board. For each particular board, the user inputs, and the data base retrieves 400, the board style number applicable to the particular aid set. Further, the user inputs, and the data base will retrieve 402 a type code indicating what type of aid set is involved. From these two bits of information, and based upon previous aid sets which may be present within the data base, the data base will generate 404 a unique set name which is derived from the particular aid type specified previously 402. The data base will also retrieve 406 the current revision level of the board and generate the current revision level 408 of the aid set. To keep track of whether or not the set is still being created, the data base will generate an indication 410 of the creation status of the aid set, and also an indication 412 of whether or not the set is being altered at its current revision level.

For display purposes, the data base will generate an indication 414 of the fields which are to be displayed on the banner seen by the user in the various aid displays.

Because of increased efficiency, sometimes it is desired if, for example, manufacturing aids are only slightly revised from one aid set to another, to duplicate some if not most of the aids from another set. Rather than generate complete new images which are duplicates, the data base instead keeps track of the parentage of the aid set. The data base will generate 416 an indication of whether or not the set has been cloned from another set, and if so, will also generate an indication 424 of which aid set from which the involved aid set was cloned.

Finally, to assist in keeping track of the status of the various revision levels at any particular point in time, for each aid set in the system there will be an indication generated 418 of previous revision levels of the board, and corresponding to these, an indication will be generated 420 of the highest aid set revision level for each board revision level. Thus, for example, if the previous revision level of the board was A, an indication may be generated describing that the aid set was on aid set revision level B for that board revision level.

Finally, for each page in the aid set, there is generated an indication 450 of any revision notices associated with the page, and an indication 452 of any applicable dates for initiation of manufacturing according to that page so that, for example, pages can be created ahead of time for beginning manufacturing at a subsequent date. As was mentioned, examples of the typical information 454 found in any particular field 456 for each page record file are illustrated in FIG. 32.

FIG. 31 illustrates a typical aid set record file. For example, the text on the left-hand side 426 of the Figure would indicate the typical type of information found with respect to each field name 428 within the aid set record file. The unique set name for each aid set is in the record field name "set-name". Whether or not the aid set is completed would be found in the "completed" field, with a T indicating that it is in fact true that the aid set is completed and an F indicating that it is an unfinished aid set. The information in the field "roll-over" would indicate whether or not the aid set had been cloned from another aid, and if so, the information contained in the field name "rolled-from" would indicate from which aid set the involved aid set was cloned.

Figure 30:
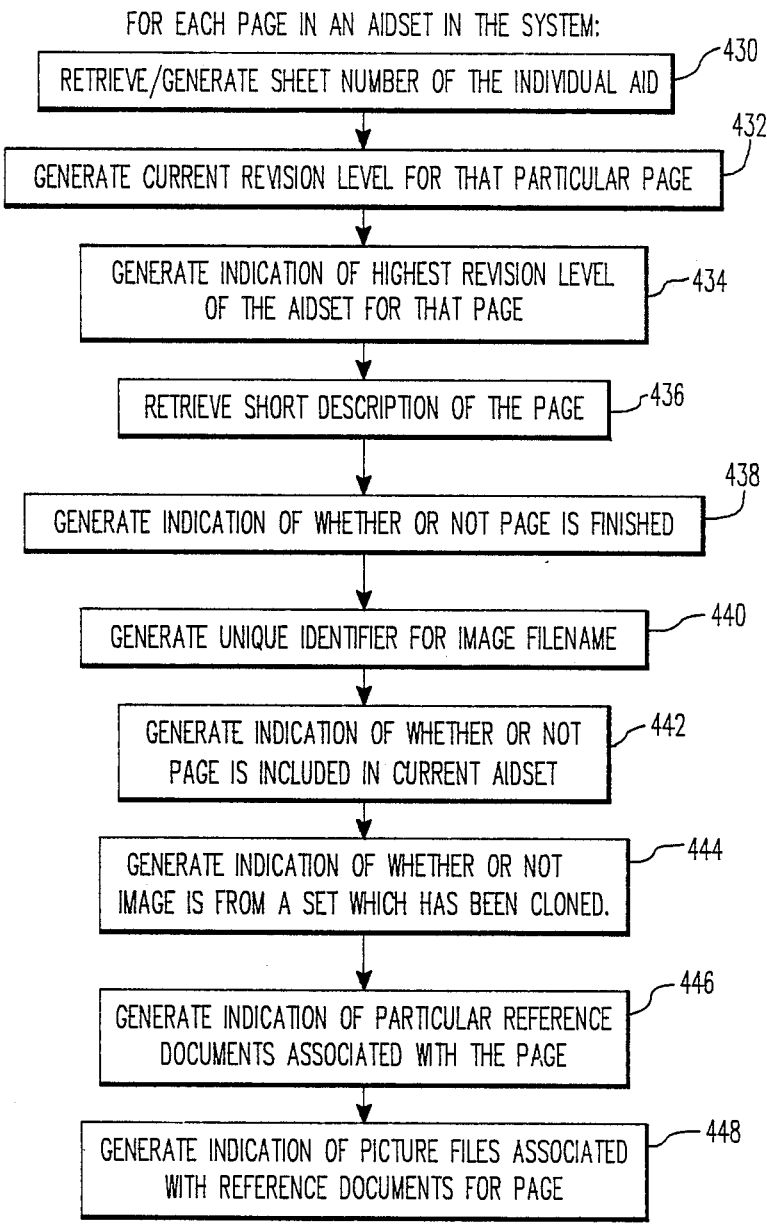

In addition to keeping track of information concerning each aid set in the product information network system 10, the data base also keeps track of pertinent information with respect to each page or sheet which may be present in each aid set. The flow diagram and typical example of a page record file are illustrate in FIGS. 30 and 32. Referring now more particularly to FIG. 30, the user inputs, and the data base either retrieves 430 the sheet number of each individual aid or, if the page is to be added to the end of the set, generates the new page number. The data base will then generate 432, based on information received from the programming concerning the aid set (FIG. 29), a current revision level for that particular page, and an indication 434 of the highest revision level of the aid set for that page. The user is requested to input, and the data base will then generate 436, a short description of the page so that it can be more easily retrieved by the manufacturing personnel as will subsequently be described.

The programming will also generate 438, based upon information received from the creation phase of the system, an indication of whether or not that particular page is finished, and will generate 440 a unique identifier for the image file name saved in the creation phase.

Because pages in a particular aid set can be revised, depending upon whether or not the board has been revised, it is desirable to have the data base generate 442 an indication of whether or not the involved, particular page is included in the current aid set. This ensures that the manufacturing personnel are able to retrieve only current information with respect to the latest board revision levels. However, the programming does not eliminate information concerning the particular page if it is no longer included within the current aid set; it is desirable to provide a complete history of the various pages involved in the aid set as it progressed through various revision levels so that if an outdated board had for some reason to be remanufactured, an aid set could be generated that would be an accurate copy of the one present when the original board was manufactured.

Also generated 444 is an indication of whether or not the image of the page is from a set which has been cloned, and an indication 446 of particular reference documents associated with the page. This latter indication provides a convenient way to reference, for example, process specifications which can be stored other places in the data base and only retrieved as needed for each particular page. Further, another indication 448 is generated of any picture files which may be associated with the reference documents associated with that particular page. For example, a reference document may itself have been generated using the product information network system creation phase, and so its generated picture files may be included within the documents referenced 446.

Figure 33A:
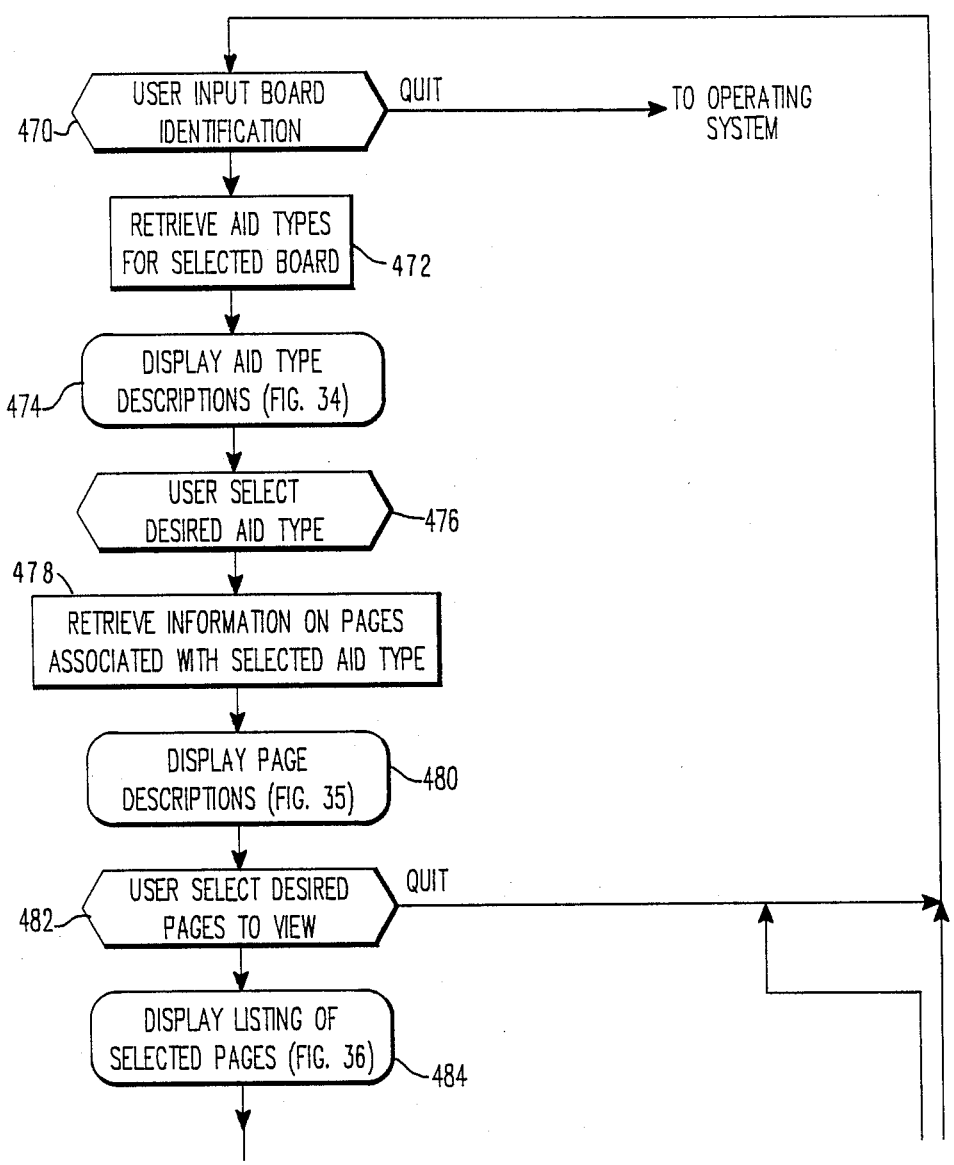
FIGS. 33A and 33B constitute a flow diagram of the computer software utilized at the manufacturing work stations to view the manufacturing aids.
Figure 33B:
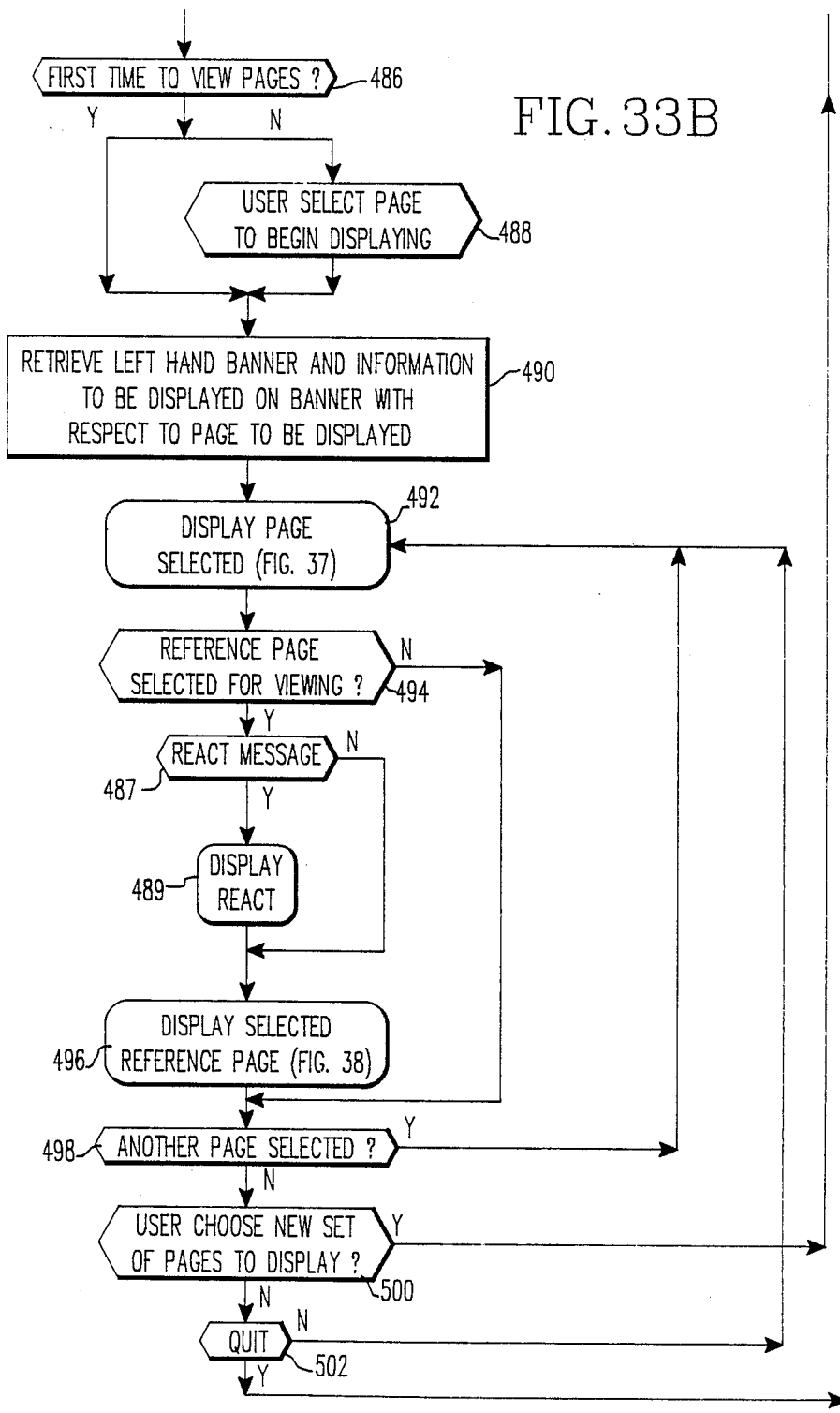

As was illustrated in FIG. 1, work stations 30 are distributed throughout the manufacturing production line and are connected via a local area network 32 to a file server 28 so that each individual work station 30 can readily obtain the manufacturing aid information. Each work station has its own operating software which will enable manufacturing personnel to access and obtain the manufacturing aids. FIGS. 33A and 33B illustrates a flow diagram of the operating instructions at each individual work station 30 which will enable the manufacturing personnel to obtain the desired aid set.

When the manufacturing person initiates operation at the work station 30, he/she is requested 470 to input the board identification style number. The computer software in the file server 28 will then retrieve 472 the aid types for the selected board and will display 474 the aid type descriptions. An example of the typical screen display 473 is illustrated in FIG. 34. The user then selects 476 the desired aid type. The software then retrieves 478 the information on the pages associated with the selected aid type, and displays 480 the page descriptions, as shown, for example, on the screen 481 illustrated in FIG. 35.

At this point, the user can either elect 482 to view desired pages, or to quit. Quitting returns the user to the initial operating screen 470 requesting board identification. However, if the user desires to view selected pages, he so marks the pages desired to view, and the software will generate a display 484 listing of the pages selected as illustrated 485 in FIG. 36.

At this point, the operating software determines 486 whether or not this is the first time that the operator has desired to view pages. If it has not, the user is requested to select 488 the page to begin the display on; otherwise, the software will begin displaying the pages in the order selected.

Figure 37:
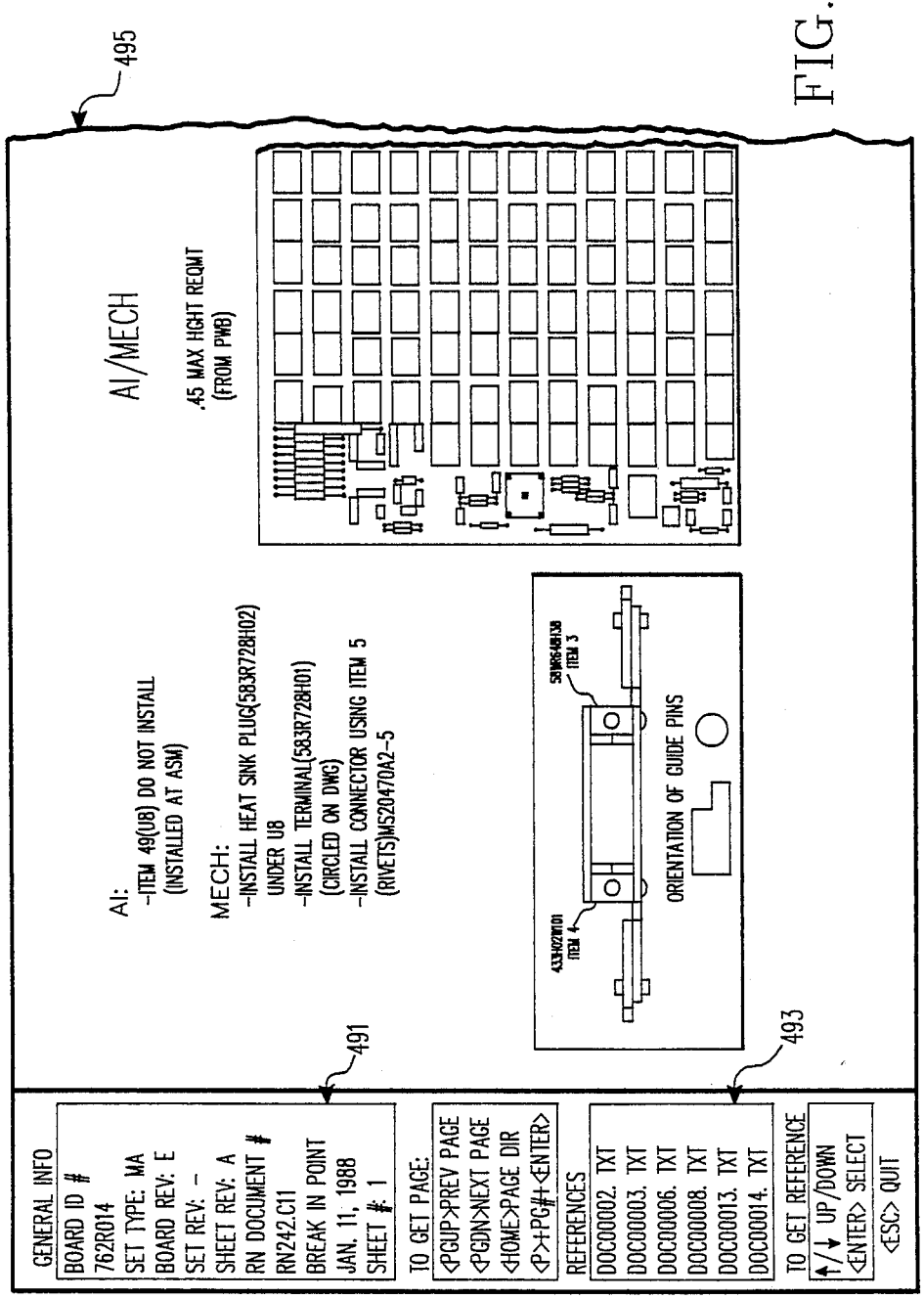

Next, the operating software generates 490 a blank left-hand banner 491 (FIG. 37) and also retrieves the information which is to be displayed on the banner with respect to the page to be displayed. As seen in FIG. 37, this information on the banner 491 concerns the board identification number, the set type, the board revision, set revision and sheet revision levels, the manufacturing start date, and the sheet number. Further, if other documents are referenced, an indication 493 of these reference documents is also displayed. The software will then check 487 (FIG. 33A) to see if there is an immediate attention, or "react" message associated with the requested page. Such a message would, for example, warn the manufacturing personnel of problems which have been or may be encountered, or could be any other type of message which would be of importance to the manufacturing personnel as they produce the product. If a react message if present, the message will be immediately displayed 489 (FIG. 33A) on the work station, and after display, the work station will display 492 the requested page. If no react message is present, the work station 30 displays 492 the manufacturing aid page. A typical display 495 which would be present on the work station 30 is illustrated in FIG. 37.

Figure 38:
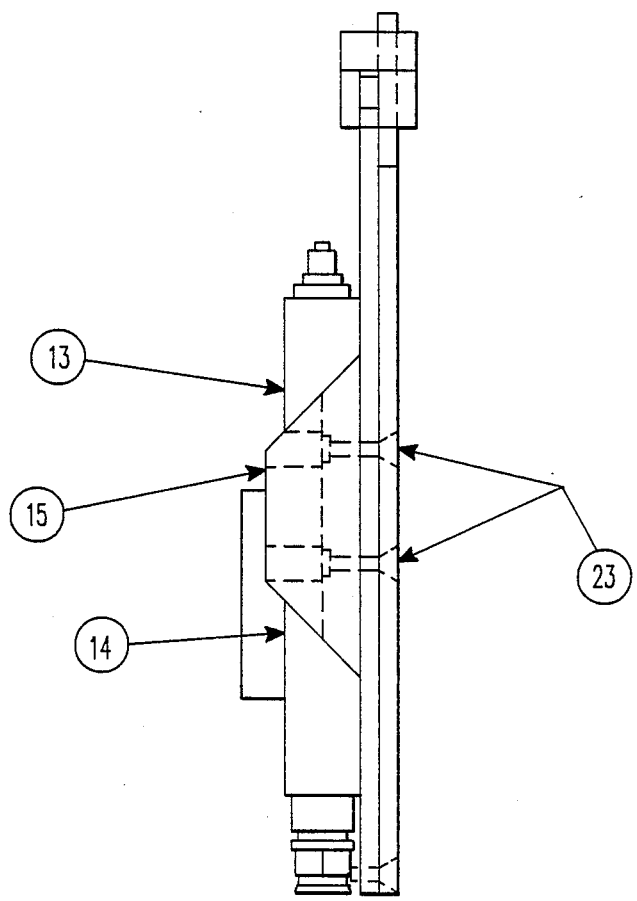

At this point, the user can select 494 to view a reference page. If the user so desires to view a reference page, the programming displays 496 the reference page selected. An example of a typical reference page is illustrated as element 497 in FIG. 38. After this page has been displayed, or if no reference page has been selected for viewing, the programming determines 498 whether or not another page had previously been selected. If so, it is displayed 492 and the process continues. If another page has not been selected, the user is given the option 500 of whether or not to choose a new set of pages to display. If so, the user is returned to the option 482 at which he can select desired pages to view. If not, he is requested to select whether or not he desires to quit utilizing the programming. If he does, it is returned to the initial option selection 470 at which point, he can select to quit and return to the operating system. If the user decides not to quit 502, he is returned to the display 492 of the last page that has been selected.

Thus, what has been described is a product information network system which provides for an efficient and up-to-date means for the creation, storage, retrieval and distribution of manufacturing aids for a manufacturing environment. The system insures that the manufacturing personnel receive the latest manufacturing information essentially instantaneously with its implementation while at the same time providing access to all the information needed with respect to the product to be produced. Old outdated information is also removed from being accessible by the manufacturing personnel as soon as it becomes obsolete, yet is still retained within the system so that the manufacturing information for any product at any particular point in time can be obtained as required.

We claim:

1. A manufacturing data creation and distribution system comprising:
   (a) a graphics-capable display screen;
   (b) a computer connected to said display screen, capable of processing programmable instructions and capable of creating and editing data, said computer capable of generating graphic images on said display screen;
   (c) a video camera having its output connected to said computer, said computer including means for digitizing the images transmitted by said video camera into a computer-readable form, said computer including means for displaying the digitized camera images on said display screen;
   (d) storage means connected to said computer for storing data received from said computer;
   (e) a plurality of microprocessor-controlled workstations each having an output screen connected thereto and capable of individually requesting and receiving data from said storage means;
   (f) microprocessor-controlled networking and file serving means connected to said workstations and said storage means for selectively retrieving data from said storage means and transmitting such data to said workstations for display on said workstation output screens; and
   (g) means disposed within said computer for selectively manipulating the images received from said video camera to generate a manufacturing aid applicable to a product to be produced and for transmitting said manufacturing aid to said storage means for storage.

2. A system for the creation and distribution of manufacturing aids which are for use by personnel in the manufacture of a product comprising:
   (a) manufacturing aid creation means for creating and editing said manufacturing aids comprising:
      (i) a graphics-capable display screen;
      (ii) a computer connected to said display screen and capable of processing programmable instructions and creating data, said computer capable of generating and editing graphic images on said display screen;
      (iii) a video camera having its output connected to said computer, said computer including means for digitizing the images transmitted by said video camera into a computer-readable form, said computer including means for displaying the digitized camera images on said display screen:
      (iv) storage means connected to said computer for storing data received from said computer; and
      (v) image manipulation means disposed within said computer for selectively manipulating the images received from said video camera to generate said manufacturing aid and for transmitting said manufacturing aid to said storage means for storage;
   (b) manufacturing aid distribution means for selectively distributing said manufacturing aids to the manufacturing personnel upon request comprising;
      (i) a plurality of microprocessor-controlled workstations each having an output screen connected thereto for individually requesting and receiving data from said storage means; and
      (ii) microprocessor-controlled networking and file serving means connected to said workstations and said storage means for selectively retrieving data from said storage means and transmitting such data to said workstations for display on said workstation output screens; and
      (iii) microprocessor-based manufacturing aid information compilation means connected to said creation means and said distribution means for processing data relative to each manufacturing aid created by said creation means with respect to each product and for retrieving such data and transmitting it to said distribution means upon request of said manufacturing personnel.

3. A computer-aided system for generating, editing and distributing graphic images of objects comprising:
   (a) a device for electronically capturing a graphic image of an object;
   (b) means for digitizing the graphic image created by said device into a computer-readable graphic image data, wherein means for digitizing the graphic image is a digitizing card in communication with said computer which transforms the image into a series of digital numbers that represent the light intensity levels at points on the image;
   (c) a graphics-capable display device for displaying the digitized graphic image;

(d) a computer in communication with said display device and capable of processing programmable instructions, creating data and capable of generating graphic images on the display device from the digitized graphic image;

(e) means in communication with said computer for editing the digitized graphic image through selective manipulation of the digitized graphic image data;

(f) means in communication with said computer for storing the digitized graphic image data, wherein means for storing the digitized graphic image comprises a user-programmable relational-type data base;

(g) at least one station for requesting and receiving digitized graphic image data from said storage means and having an output device for displaying the digitized graphic image, wherein said station for requesting and receiving data is microprocessor-controlled and equipped with software to enable independent operation from other stations and from said computer; and (h) means for retrieval and distribution of the stored digitized graphic image data for transmitting from storage means selected image data to said station for output device display.

4. The system of claim 3 wherein the means for retrieval and distribution from storage is comprised of a microprocessor-controlled networking and file serving system.

5. The system of claim 4 wherein the device for electronically capturing the graphic image is a television camera.

6. The system of claim 5 wherein the object of the graphic image is an assembly drawing used for printed circuit boards.

7. A computer-aided system for generating, editing and distributing graphic images of objects comprising:
(a) a device for electronically capturing a graphic image of an object;
(b) means for digitizing the graphic image created by said device into computer-readable graphic image data;
(c) a graphics-capable display device for simultaneously displaying the digitized graphic image and textual data;
(d) a computer in communication with said display device, said computer capable of processing programmable instructions, creating and displaying textual data and capable of generating graphic images on the display device from the digitized graphic image;
(e) means in communication with said computer for editing the digitized graphic image through selective manipulation of the digitized graphic image data;
(f) means in communication with said computer for storing the digitized graphic image data;
(g) means in communication with said computer for editing the textual data;
(h) means in communication with said computer for storing the textual data;
(i) at least one station for requesting and receiving digitized graphic image data and textual data from storage means and having an output device for displaying the digitized graphic image and the textual data; and
(j) means for retrieval and distribution of the stored digitized graphic image data and the textual data for transmitting from storage means selected image and textual data to said station for output device display.

8. The system in claim 7 wherein means for storing the digitized graphic image data and means for storing the textual data comprises a user-programmable relational-type data base.

9. The system of claim 8 wherein means for digitizing the graphic image is a digitizing card in communication with said computer which transforms the image into a series of digital numbers that represent the light intensity levels at points on the image.

10. The system of claim 9 wherein said station for requesting and receiving data are microprocessor-controlled and equipped with software to enable independent operation from other stations and from said computer.

11. The system of claim 10 wherein the means for retrieval and distribution from storage is comprised of a microprocessor-controlled networking and file serving system.

12. The system of claim 11 wherein the device for electronically capturing the graphic image is a television camera.

13. The system of claim 12 wherein the object of the graphic image is an assembly drawing used for printed circuit boards.

* * * * *